(12) United States Patent
Ishii

(10) Patent No.: US 6,781,786 B2
(45) Date of Patent: Aug. 24, 2004

(54) MAGNETIC DISK DRIVE SYSTEM

(75) Inventor: Koji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 10/195,864

(22) Filed: Jul. 15, 2002

(65) Prior Publication Data

US 2003/0156347 A1 Aug. 21, 2003

(30) Foreign Application Priority Data

Feb. 21, 2002 (JP) ........................................ 2002-044843

(51) Int. Cl.⁷ ............................................ G11B 5/596
(52) U.S. Cl. .................................................. 360/78.04
(58) Field of Search ...................... 360/78.04, 78.12, 360/75

(56) References Cited

FOREIGN PATENT DOCUMENTS

| JP | 6-28800 | 2/1994 |
|----|---------|--------|
| JP | 7-326032 | 12/1995 |

*Primary Examiner*—David Hudspeth
*Assistant Examiner*—Mitchell Slavitt
(74) *Attorney, Agent, or Firm*—Greer, Burns & Crain, Ltd.

(57) ABSTRACT

A magnetic disk drive system having a write head $H_w$ and a read head $H_r$ which can move over a magnetic disk in a radial direction of the disk and are arranged at a distance from each other. At a predetermined write start timing $t_{WG}$, it writes measurement information by the write head in a specific sector at a first timing $t_W$, then reads the information by the read head, detects predetermined positional information included in the information, and produces a second timing $t_{DA}$. The system subtracts the interval between the second timing and the start timing from the interval between the first timing and second timing to measure the write/read head distance time difference in the track direction of the magnetic head unit. The write/read head distance information is used for correction and control of the operation of the magnetic head unit.

23 Claims, 21 Drawing Sheets

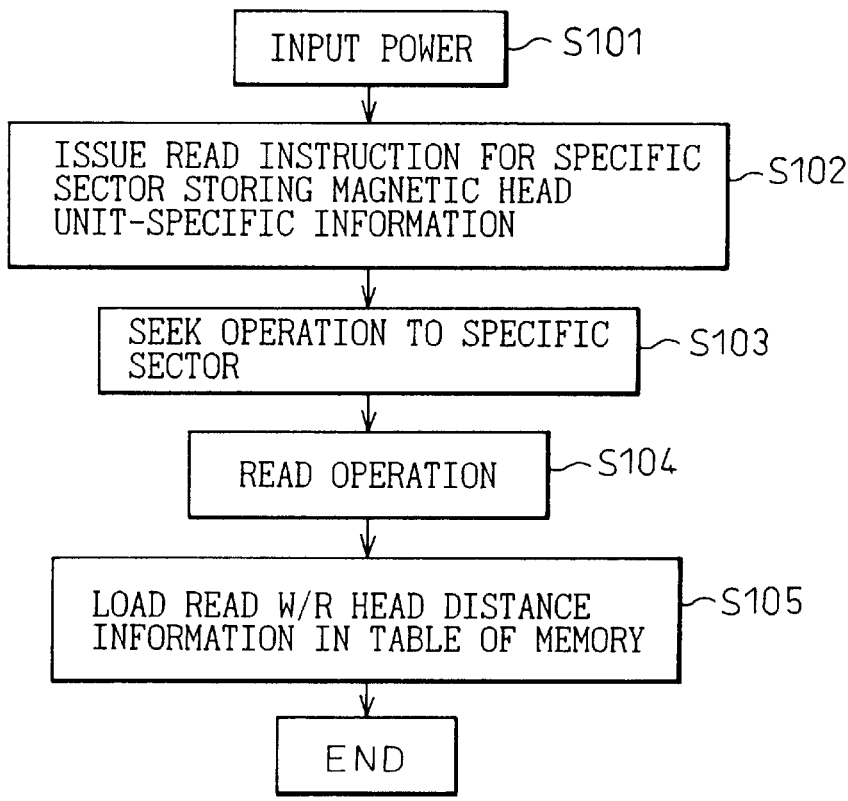
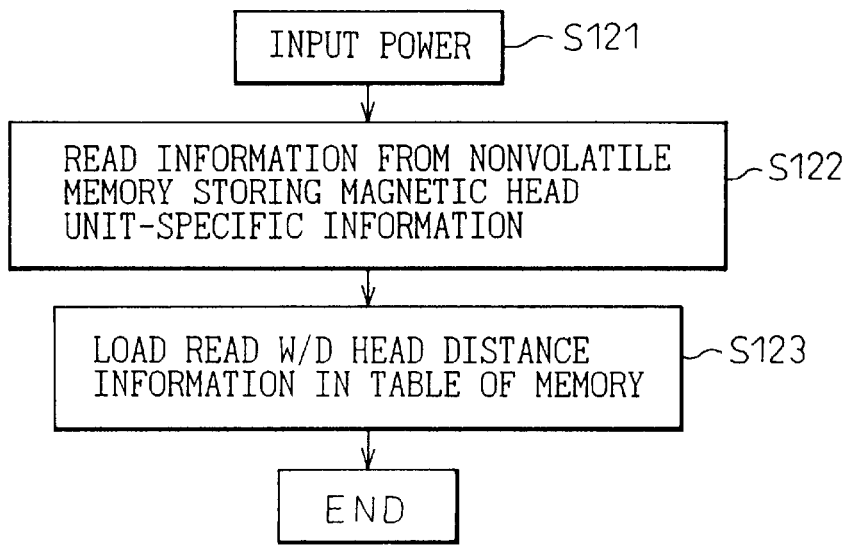

MAGNETIC DISK DRIVE SYSTEM

BACKGROUND OF THE INVENTION

1. Field of the Invention

The present invention relates to a magnetic disk drive system which can be connected to a computer for writing or reading data, more particularly relates to a magnetic disk drive system which can correct manufacturing error in a distance between a write head and a read head (hereinafter referred to as the "write/read head distance") and thereby adjust a timing of writing data to the magnetic disk and raise a format efficiency of the disk and which can adjust a head position when reading data from the magnetic disk and thereby raise a track density.

2. Description of the Related Art

A magnetic disk drive system is essential in computer data processing. The spread of PCs has led to use of hard disk drives (HDD) for recording and for reading and reproducing data. Recently, hard disk drives have found uses beyond PCs and have been increasingly used in for example audio-visual systems, car-mounted systems, etc. Further, the information handled there has also become more diverse and the amount of the data handled has become enormous in many cases. The recording capacity of magnetic drive systems is therefore being increased.

In order to meet the demand for increased capacity in recent magnetic disk drive systems, magnetoresistive (MR) head units designed to handle high bit densities are often used for the magnetic heads. A magnetoresistive head unit has a read head and write head in a single unit. A magnetoresistive element is generally used for the read head, while an inductive element is used for the write head. The read head and the write head are separated by exactly a specific distance between their core centers when seen along the track direction. Further, the core centers are arranged offset by exactly a specific distance in the radial direction of the magnetic disk. Further, the head unit itself is attached to a head arm with a specific angle. Therefore, when the head unit moves over the magnetic disk, the head unit and head arm change in positional relationship with the tracks on the magnetic disk. Accordingly, the on-track timing differs between the read head and write head depending on the track position of the magnetic disk.

Summarizing the problems in the related art, as stated above, such a magnetic disk drive system is often used as a data storage device of a computer etc. Further, a magnetoresistive head unit is often used for the magnetic head of this magnetic disk drive system. This magnetoresistive head unit realizes high bit density recording by being provided with a separate read head core and write head core in a single unit.

The read head core and write head core used in this magnetoresistive head unit, however, are delicate elements. Further, when being assembled into a magnetic head unit, since the read head core and the write head core are separately arranged, manufacturing differences occur in the relative position of the read head core and the write head core among different units.

Further, in general, a magnetic disk device uses a rotation mechanism along with a magnetic disk and head carriage. Therefore, depending on the position of the magnetic head unit, the angle between the axial line of the magnetic head unit and a track changes and the distances with respect to a track from a center of the read head core and a center of the write head core in the track direction change. Further, since the distance between the write head core and read head core varies for each magnetic head unit, the position where positioning information to be read by the read head core is written on the magnetic disk ends up changing depending on the magnetic head unit.

In the related art, a fixed distance has been given not considering the difference in the magnetic head unit from the design target distance or the average distance at the time of manufacture and the timings at a write operation and read operation changed by that amount. The margin with respect to the difference has resulted in extra time in the format.

When writing positioning information to be read by the read head core at a certain timing, when actually written on the magnetic disk, deviation occurs in the written position according to the magnetic head unit due to the difference in the distance between the write head core and the read head core.

If the deviation in the write position becomes large, the phenomenon of the positioning servo information being written over and erased occurs. To prevent such a write-over phenomenon from occurring, it is necessary to give a sufficient margin of time to the format. When employing this measure, the format efficiency ends up deteriorating by the amount of that margin of time. Further, the recent rise in transfer rates and the higher bit densities in systems using magnetic disks have made systems more susceptible to the effects of error in the distance between the write head core and read head core. The deterioration in the format efficiency can no longer be ignored.

Further, since the read head core and the write head core are separate in this magnetic head unit, differences in manufacture result in a deviation at the center of the read head core and the center of the write head core. Since a rotation mechanism is used together with the magnetic disk and head carriage, the angle between the axial line of the magnetic head unit and a track changes depending on the position of the magnetic head unit and the amounts of deviation of the center of the read head core and the write head core from the track changes. Due to this phenomenon, in the past, the track position has been changed to measure the off-track margin and the correction positions connected by a line for use in correcting the amounts of deviation of the cores.

Even if taking such a measure, however, in recent years the track density of the systems used has been made higher and therefore linear correction is no longer sufficient for correction. Therefore, the problem arises of the trouble of not only the error rate rising, but also the data recorded on the adjoining track being erased. Further, if trying to reduce the error by linear correction, it is necessary to increase the measurement points. This being so, a tremendous amount of time has to be spent for measuring the offset margin at the time of shipment corresponding to the increase in measurement points. This makes this technique unsuitable for mass production. Further, due to the increase in the measurement points, there are the problems that the correction values also become more numerous, the amount of tables for storing the correction values also becomes greater, and therefore the memory is strained.

Further, in this magnetic head unit, since the amounts of deviation of the center of the read head core and the center of the write head core from the track change, the track position has been changed to measure the off-track margin to correct the amounts of deviation of the magnetic head cores. Therefore, to most improve the positioning precision in a write operation, at the time of writing, the read head core is positioned at the center of the target track for the write operation, while at the time of reading, the read head core is moved to the write position using the amount of deviation of the head core as the offset.

This deviation information is a value specific to the magnetic head unit, so is stored in a specific sector of the magnetic disk at the system used. In the related art, the read operation has been performed by searching for the specific sector by using the amount of correction of deviation of the design target or average of the manufacturing design and re-reading while changing the amount of offset until reading the specific sector.

Alternatively, the read operation has been performed by recording the amount of deviation specific to the magnetic head unit in a flash read only memory (ROM) or other nonvolatile memory, reading the deviation information from the nonvolatile memory at the time of turning the power on, and adding the amount of offset corresponding to the deviation for reading at the time of reading the specific sector. In recent years, however, the track density of the systems used has been increased, so the width of the write head core itself has become smaller and the amount of deviation with respect to the track width has become greater. Under this circumstance, if reading using the initial value based the design target or manufacturing average, a large number of offset read operations becomes necessary until finding the specific sector storing the amount of deviation specific to the magnetic head. In some cases, the phenomenon arises of normal reading becoming impossible.

Further, when recording the specific information in a nonvolatile memory, while the specific sector can be easily read at the time of turning on the power, a nonvolatile memory has to be mounted, so the cost rises. Further, in this case, not only is exchange of the printed circuit board on which the nonvolatile memory is mounted no longer easy, but also repair work at the time when a printed circuit board breaks down becomes no longer simple and a tremendous amount of time is required for the repair.

SUMMARY OF THE INVENTION

An object of the present invention is to provide a magnetic disk drive system designed to correct the read position or write position to prevent the problem unique to a magnetic head unit at the time of manufacture and simplifying the means for correcting position at the time of writing data to or reading data from a magnetic disk.

To achieve the above object, according to the present invention, there is provided a magnetic disk drive system wherein a magnetic head unit able to move over a rotating magnetic disk in the radial direction of the disk has a write head and a read head arranged in parallel separated by a certain distance and can write data on the magnetic disk or read data from the magnetic disk, provided with a write/read head distance measuring means for measuring distance information between the write head and said read head, a storage means for storing the measured write/read head distance information, and a control means for correcting an operation of the magnetic head unit based on the write/read head distance information read from the storage means.

Preferably, the write/read head distance information is stored in a specific sector at a predetermined track position on the magnetic disk or in a nonvolatile memory provided in the system.

Preferably, at a predetermined write start timing, the write/read head distance measuring means instructs the writing of measurement use write information in a sector selected for measurement by the write head at a first timing, then reads the write information by the read head, detects the predetermined positional information included in the write information, and produces a second timing and subtracts the time interval between the second timing and the write start timing from the time interval between the first timing and the second timing to measure the write/read head distance in the track direction for that magnetic head unit.

Further, preferably, when positioning the magnetic head unit on the measurement track, the write/read head distance measuring means shifts the magnetic head unit in the radial direction of the disk by exactly a predetermined amount of offset from the on-track position, reads the measurement information by the read head while subtracting a predetermined amount of offset from the offset position for every revolution of the magnetic disk, and measures the write/read head distance in the radial direction of the magnetic disk based on the amount of offset when the information can be read. It is also possible to measure the write/read head distance at a plurality of track positions on the magnetic disk and produce an n-ary polynomial for the write/read head distance for that track position based on the plurality of write/read head distance.

Further, the write/read head distance measuring means stores the order and coefficients in the n-ary polynomial in the storage means and, when reading by the read head, the control means finds the write/read head distance at the on-track position and adds an amount of offset based on the write/read head distance to the track position to perform a read seek operation.

Further, when writing specific information at a predetermined track position by the write head, the control means reads the write/read head distance information corresponding to that predetermined track position from the storage means, produces correction information based on the write/read head distance information, then sets the magnetic head unit on the predetermined track position, then writes the specific information by the write head at a position shifted from the predetermined track position by exactly the amount of the correction information.

BRIEF DESCRIPTION OF THE DRAWINGS

These and other objects and features of the present invention will become clearer from the following description of the preferred embodiments given with reference to the attached drawings, wherein:

FIG. 5 is a flow chart for explaining the operation of reading the write/read head distance written at a specific sector;

FIG. 6 is a flow chart for explaining the operation of reading the write/read head distance stored in a nonvolatile memory;

DESCRIPTION OF THE PREFERRED EMBODIMENTS

Figure 23:
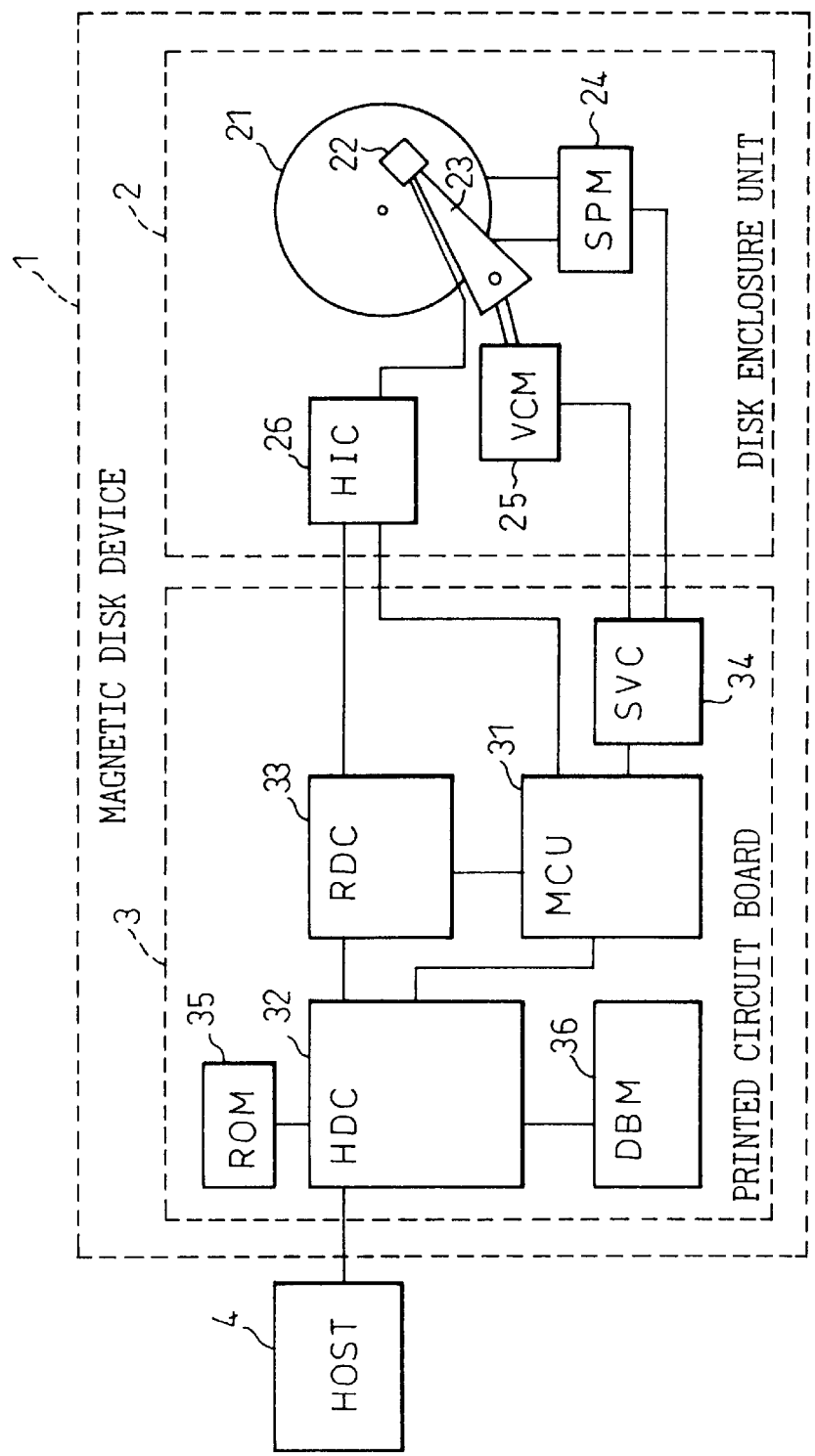
FIG. 23 is a view of the general block configuration of a magnetic disk device of the related art.

In order to make the effects of the invention clearer, a general magnetic disk device relating to the present invention will be explained first below:

FIG. 23 is a block diagram of a conventional magnetic disk device used for a hard disk device. The magnetic disk device 1 may be roughly divided into two parts: a disk enclosure unit 2 and a printed circuit board 3. Normally, these two parts are provided in the same housing. The magnetic disk device 1 is connected to a host system (HOST) 4 such as a personal computer.

The disk enclosure unit 2 includes a magnetic disk 21, a magnetic head unit 22, a spindle motor (SPM) 24, a voice coil motor (VCM) 25, and a head IC (HIC) 26. The magnetic disk 21 is rotated at a high speed in a certain direction by the spindle motor 24. Further, the magnetic head unit 22 is fastened to a front end of a head arm 23 attached to the voice coil motor 25. When the voice coil motor 25 is driven, the magnetic head unit 21 is moved over the magnetic disk 21 in the disk radial direction perpendicularly intersecting the tracks (or cylinders) to scan the desired track (or cylinder) on the rotating magnetic disk 21.

Figure 24A:
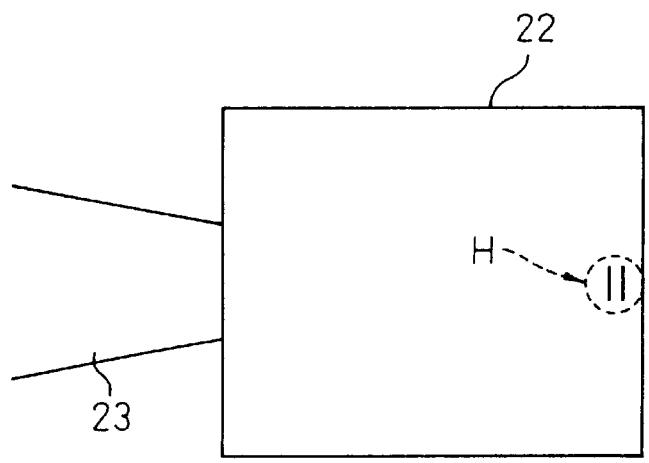
FIGS. 24A and 24B are views of the arrangement of a magnetic head unit.
Figure 24B:
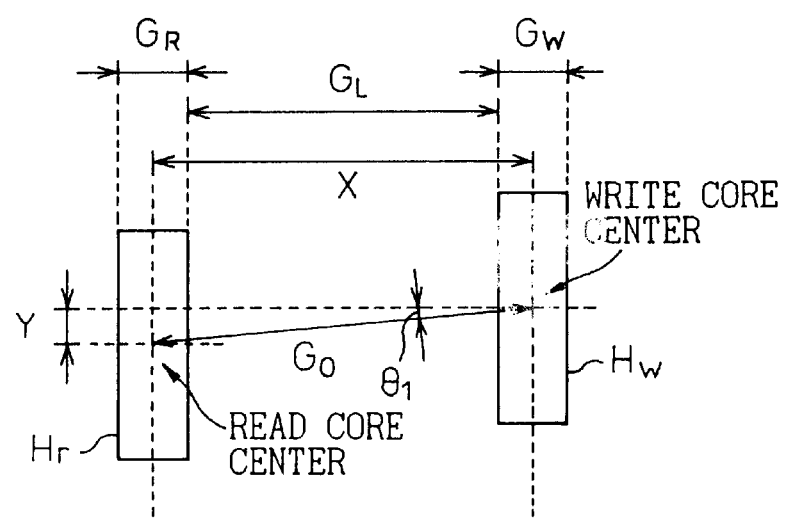

FIGS. 24A and 24B show the concrete configuration of the magnetic head unit 22. The type of the magnetic head unit used in the magnetic disk device here is one which performs the write and read operations by separate heads, though there is a type which performs both the write and read operations by the same head. As shown in FIG. 24A, a head unit H is arranged at the front end of the magnetic head unit 22 attached to the front end of the head arm 23.

The head unit H includes a write head $H_w$ and a read head $H_r$. These are arranged in the relationship shown in FIG. 24B. The write head $H_w$ and the read head $H_r$ are arranged in parallel and fastened in the circumferential direction of the tracks on the magnetic disk 21 at the front end of the head arm 23. Note that while not shown, when not making the magnetic head unit 22 scan the tracks, the magnetic head unit 22 is normally moved away from the magnetic disk 21 and held by providing a ramp mechanism engaging with the front end of the arm.

Here, as the magnetic head unit 22, a magnetoresistive head unit designed for a high bit density recording is used. The magnetoresistive head unit has a read core serving as a read head $H_r$ and a write core serving as the write head $H_w$ in a single unit. A magnetoresistive element is used for the read core, while an inductive element is used for the write core.

As shown in FIG. 24B, the read head $H_r$ has a thickness $G_r$ in the track direction, while the write head $H_w$ has a thickness $G_w$. Looking along the track direction, they are separated by exactly the distance X between the core centers. These core centers are arranged shifted by exactly the distance Y in the radial direction of the magnetic disk 21.

Figure 25:
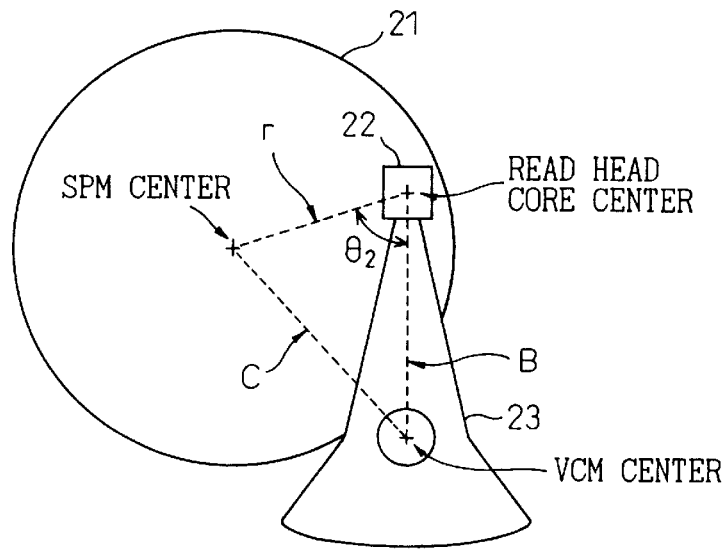
FIG. 25 is a view of the arrangement of a magnetic disk and magnetic head unit.

FIG. 25 shows an outline of the positional relationship between the magnetic disk 21 and the magnetic head unit 22. The magnetic disk 21 rotates by a high speed in one direction about the SPM center by the spindle motor 24. The magnetic head unit 22 performs a seek operation on this high speed rotating magnetic disk 21 by the control of the drive of the voice coil motor 25. Here, when in the middle of a seek operation for writing data, the distance B between the center of the write core of the write head in the magnetic head unit 22 and the VCM center and the distance C between the SPM center and the VCM center are constant, but the distance r between the center of the write core of the magnetic head unit 22 and the SPM center of the magnetic disk 21 and the angle $\theta_2$ formed by the line connecting the center of the write core of the magnetic head unit 22 and the SPM center of the magnetic disk 21 with the axial line of the arm 23 changes according to this seek operation.

In the magnetic disk device 1 configured in this way, the read head $H_r$ and the write head $H_w$ are arranged separately separated by exactly the distance X. Further, they are shifted by exactly the distance Y. The head unit H itself is attached to the head arm 23 at a certain angle. Therefore, the positional relationship between the head unit H and head arm 23 and tracks on the magnetic disk 21 changes as shown in FIG. 26 and the timing of the on-track state differs between the read head $H_r$ and the write head $H_w$ depending on the track position of the magnetic disk 21.

Figure 26:
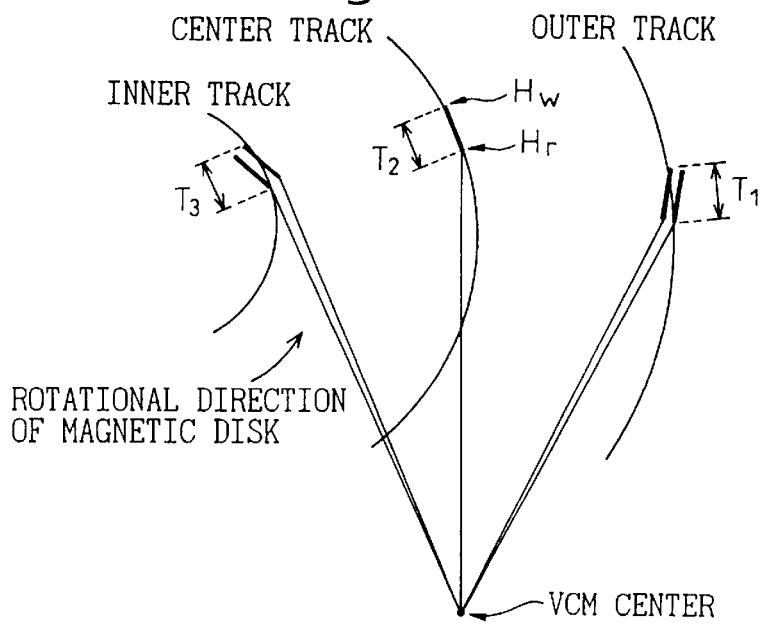
FIG. 26 is a view explaining the change of a write/read head distance in accordance with a track position on a magnetic disk.

The state of this change is shown schematically in FIG. 26. An example where the head arm 23 is driven by the voice coil motor 25 and is rotated by a rotation system about the voice coil motor is shown. The bold lines in the figure show the head unit H. The read head $H_r$ and the write head $H_w$ are attached to the two ends. For example, when positioned on the center track, the line connecting the centers of the read head $H_r$ and write head $H_w$ in the head unit H substantially matches the on-track line segment and the distance $T_2$ corresponds to the distance $G_0$ shown in FIG. 24B. Further, looking at the track outside or inside of that, the timings by which the read head $H_r$ and write head $H_w$ reach the same track become offset. Therefore, to position the heads on the outer or inner track from the position of the illustrated center track, the rotational drive of the head arm 23 is adjusted to match with the track position.

Explaining the operation of the magnetic disk device 1 shown in FIG. 23, the recorded data read by the read head $H_r$ is sent to a head IC 26. The head IC 26 amplifies and outputs the recorded data as a reproduction signal. Further, when the recorded signal for the magnetic head unit 22 is sent to the head IC 26, the head IC 26 sends the recorded data to the magnetic head unit 22 to have it recorded at the write position of the predetermined track on the magnetic disk 21.

On the other hand, the printed circuit board 3 includes a microprocessor unit (MPU) 31, a hard disk controller (HDC) 32, a read/write channel unit (RDC) 33, a servo controller (SVC) 34, a flash ROM 35, and a data buffer memory (DBM) 36. These are attached to a board.

The microprocessor unit 31 operates in accordance with a program stored in the ROM 35 to control the system of the magnetic disk device 1 as a whole. It controls the positioning of the magnetic head unit 22, controls the interface, initializes and sets the peripheral LSIs, manages the defaults, etc.

The hard disk controller 32 has a built-in random access memory (RAM) and serves as an interface for managing the input and output with the host system 4 including error correction, generation of phase locked loop (PLL) blocks, etc. Further, the servo controller 34 operates to drive the spindle motor 24 and the voice control motor 25. It controls the driver for the spindle motor 24 and the driver for the voice control motor 25 in accordance with instructions from the microprocessor unit 31.

Further, the read/write channel unit 33 modifies the write data for the magnetic disk 21 supplied from the hard disk controller 32 and outputs it to the head IC 36 or detects the data from the output signal of the head IC 36 read from the magnetic disk 21 by the magnetic head unit 22, demodulates the code, and outputs it to the hard disk controller 32.

The magnetic disk device 1 is comprised as explained above. The data is written and recorded on concentric tracks on the magnetic disk 22 followed by the magnetic head unit 22 or read and reproduced by the magnetic head unit 22 following the tracks. The write head $H_w$ provided in the magnetic head unit 22 is used for writing of data, while the read head $H_r$ is used for the reading of data.

Here, the flow of the signal at the time of writing data will be explained. The data write instruction and data for a certain logical block address are transferred from the host system 4 to the hard disk controller 32. The hard disk controller 32 assigns the logical address, that is, the track number, head number, and sector number, from the logical block address and transfers the logical address information to be written to the microprocessor unit 31. The microprocessor unit 31 controls the servo controller 34 for driving the head arm 23 so as to move the magnetic head unit 22 to the target track.

Further, the microprocessor unit 31 controls a pre-amplifier. It selects the head unit covered, that is, the physical head unit, from a plurality of head units corresponding to a plurality of provided magnetic disks. The data once stored in the buffer memory 36 is sent through the hard disk controller 32 to the read/write channel unit 33. Simultaneously, the hard disk controller 32 prepares a write gate (WG) at the timing of the target sector and sends it to the read/write channel unit 33 and pre-amplifier. The read/write channel unit 33 modulates the data for writing in the magnetic disk 21 and sends it as the write data to the pre-amplifier. The pre-amplifier receives the write gate prepared by the hard disk controller 32, enters the write mode, and sends a write current corresponding to the write data to the write head $H_w$. The data is written on the magnetic disk 21 by this series of operations.

Next, the flow of the signal at the time of reading data will be explained. A data read instruction for a certain logical block address is transferred from the host system 4 to the hard disk controller 32. In the same way as the time of a write operation, the hard disk controller 32 assigns the physical address from the logical block address and sends the physical address information to be read to the microprocessor unit 31. The microprocessor unit 31 controls the servo controller 34 and moves the magnetic head unit 22 to the target track. The hard disk controller 32 opens a read gate (RG) for the target sector. At the read head $H_r$ comprised of the magnetoresistive element, the resistance value changes by the magnetic flux recorded on the magnetic disk 21 at the time of writing. The pre-amplifier amplifies the change in voltage based on this change in resistance and sends it to the read/write channel unit 33. The read/write channel unit 33 demodulates the data based on the waveform of the signal received from the pre-amplifier and sends it to the hard disk controller 32. The data stored once in the buffer memory 36 from the hard disk controller 32 is transferred through the hard disk controller 32 to the host system 4.

Figure 27:
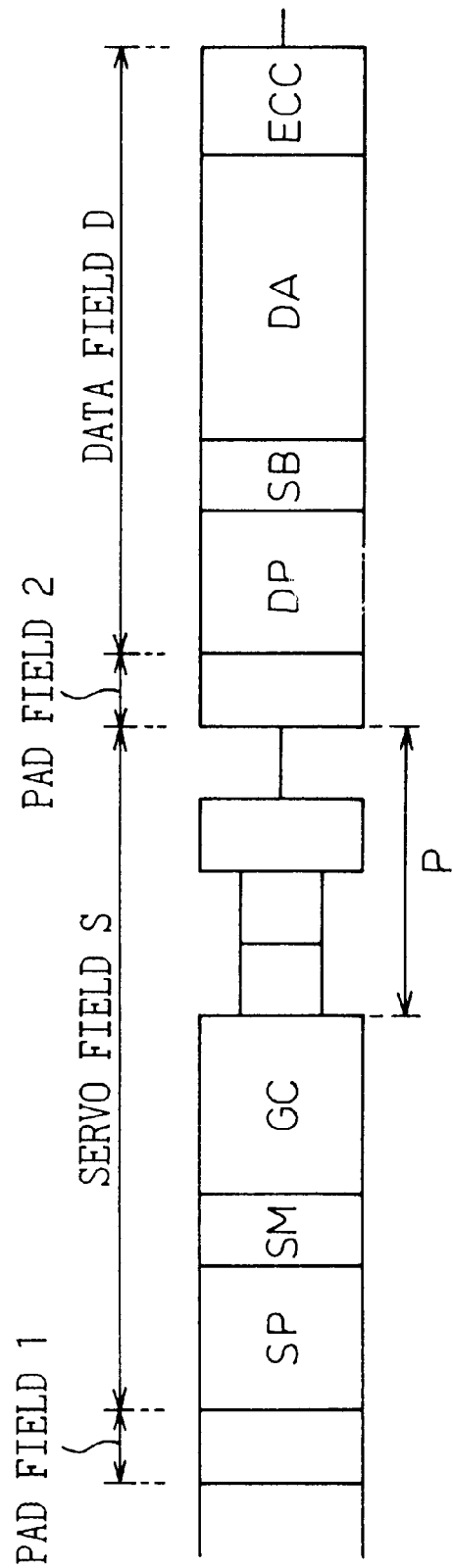
FIG. 27 is a view of an example of the format of medium information recorded on a magnetic disk.

Next, referring to FIG. 27, an example of the medium information recorded on the magnetic disk 21 will be shown. The illustrated medium information is recorded on one of the plurality of sectors provided on the tracks of the magnetic disk 21. This medium information is roughly divided into a support field and a data field. A plurality of servo field data are arranged in a radial signal pattern on the plurality of tracks arranged concentrically on the magnetic disk 21. By the use of the servo field data, high precision servo control of the magnetic disk 21 is performed and a high density of data is realized.

Here, the servo field will be explained. The servo preamble field SP is a preparatory segment for demodulating the servo signal and adjusts the amplitude for an automatic gain control (AGC) circuit to make the head output constant. Simultaneously, it makes adjustments so the PLL circuit locks the signal waveform and the servo decoder circuit in phase. Further, a sync mark field (SM) shows that what follows is a gray code (GC). The sync mark field serves as reference timing for the positioning operation, write operation, read operation, etc. The gray code field records the track position information.

Further, a position field P includes amplitude information for positioning the magnetic head unit 22 to the track. A burst A, burst B, burst C, and burst D are recorded. These burst data are written after the gray code field and have relative positional information of the magnetic head unit 22 to the track. In general, burst data is comprised of four signal patterns. These signal patterns are written so as to be sequentially arranged alternately straddling the two tracks adjoining a track. The relative position between the center of the track and the position of the magnetic head unit 22 can be calculated from the amplitude of the signal of the track read by the magnetic head unit 22. Whether the head unit is positioned on the track is judged by the combination of magnitudes of the burst amplitudes. This is used for positional control of the magnetic head unit 22.

Next, the data field will be explained. A data preamble field (DP) is, like the servo field, a preparatory segment for enabling reading of the output of the magnetic head unit and adjusts the amplitude for the automatic gain control circuit to make the magnetic head unit output constant. Simultaneously, it makes adjustment for the PLL circuit to lock the signal waveform and data demodulation circuit in phase. A sync byte field (SB) is data start positional information for showing that what follows is data. The automatic gain control circuit adjusts the amplitude, while simultaneously the PLL circuit locks the phase of the demodulation timing. After the phase is locked with the optimum output, the read/write channel unit 33 opens an sync byte window (SBW) and starts an operation for finding the sync byte. When finding the sync byte, the read/write channel unit 33 recognizes the following as data and demodulates the read data.

The data field (DA) records the data which had been sent from the host system 4. After the end of the data field, an error correction code field (ECC) is arranged. Information for correcting error is recorded there. Note that there is one pad field each at the front end of the servo field and between the servo field and data field. These are extra intervals for differences in the deviation in write position due to the distance error between the read head $H_r$ and the write head $H_w$. Note that in this example, there is one sync byte field, but a format having several sync bytes is also sometimes used.

The magnetic disk device explained above is used as a data storage device of a computer etc. The magnetoresistive head unit used for the magnetic head unit of this magnetic disk device, however, realizes high bit density recording by separate provision of a read head core and a write head core in a single unit. Due to the fact that the read head core and write head core are arranged separately, manufacturing differences arise in the relative position of the read head core and write head core.

Further, as explained in FIG. 27, the distances from a track of the center of the read head core and the center of the write head core in the track direction change depending on the position of the magnetic head unit. Further, the distance between the write head core and the read head core varies with each magnetic head unit. Therefore, in actuality, the position written at on the magnetic disk ends up differing depending on the magnetic head unit. Accordingly, as explained above, various problems arise.

Next, embodiments of a magnetic disk drive system according to the present invention able to solve these various problems will be explained. Below, three embodiments of different methods for correcting the read position or write position when writing data on or reading data from a magnetic disk will be explained.

First Embodiment

In the magnetic disk drive system of the first embodiment, the distance between heads in the track direction is measured for the write head and read head in the magnetic head unit used and the data write position is corrected based on the measured write/read head distance. Due to this, even if there is error in the write/read head distance specific to the magnetic head unit in manufacture, when writing data on to the individual tracks, it is possible to correct the data write start timing without any effect from the error. The first embodiment will be explained with reference to FIG. 1 to FIG. 7.

First, the method of measuring the distance between heads in the track direction will be explained for the write head and the read head in the magnetic head unit used. In measuring this write/read head distance, a specific track on the magnetic disk corresponding to the magnetic head unit used is selected and the magnetic head unit is used to write measurement data on that specific track. Then, the write/read head distance relating to the magnetic head unit is found from the write timing and the read timing for the measurement data. Here, one example of the method of use of the sync byte field for measuring the distance in the track direction between the write head and the read head is shown. In this example, the case is shown where the write head is arranged behind the read head.

Figure 1:
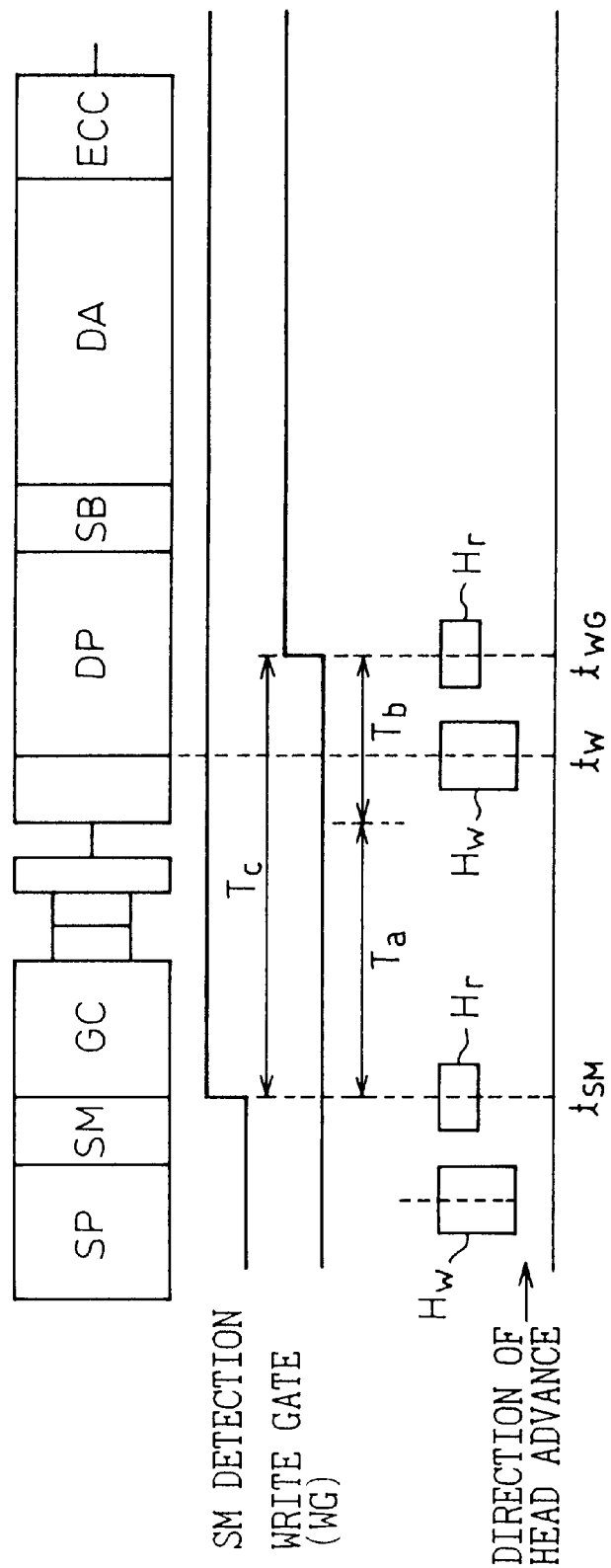
FIG. 1 is a time chart for explaining the operation of writing measurement use medium information on a specific track.

FIG. 1 shows an example of the measurement use medium information. The measurement use medium information has a format similar to the medium information shown in FIG. 27. Further, FIG. 1 shows the timing of the write operation by the magnetic head unit for the measurement use medium information.

First, the magnetic head unit is positioned on the specific track for measurement. Next, that magnetic head unit is used to write the measurement use medium information in a sector of a suitable location. At this time, the write gate is produced at the time interval $T_c$ starting from the timing $t_{SM}$ of the detection of the sync mark and extending over the time interval $T_a$ until the start of the data field on the format and the time interval $T_b$ anticipating the maximum write/read head distance time difference. At the timing $t_{WG}$ where the write gate is opened, the above data preamble field, sync byte field, data field, error correction code field, etc. are successively written. The timing $t_{WG}$, however, is based on the read head $H_r$. The write head $H_w$ is arranged behind the read head $H_r$, so the write operation actually is started at a timing $t_W$ obtained by subtracting the actual write/read head distance from the write gate start timing $t_{WG}$.

Figure 2:
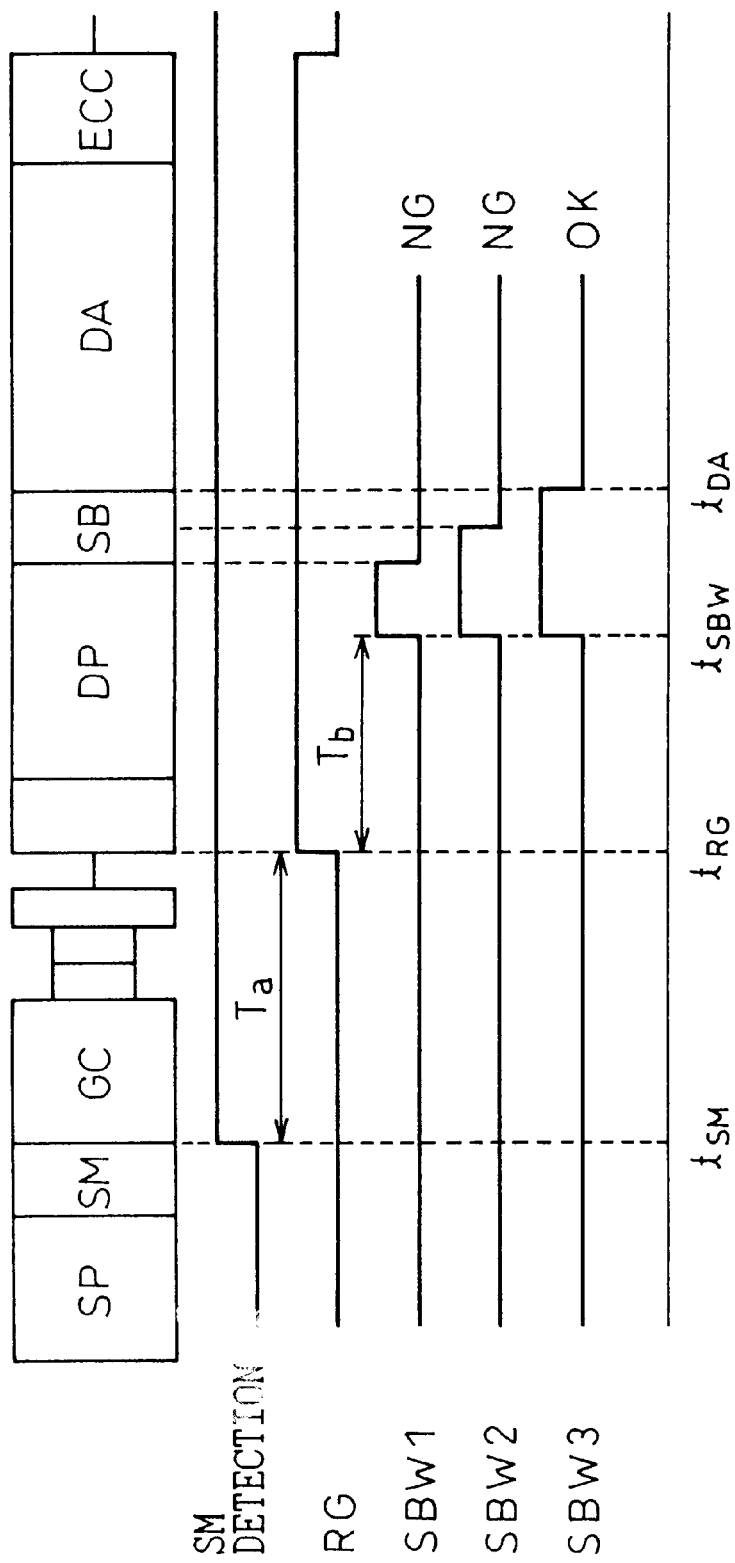
FIG. 2 is a time chart for explaining the operation of reading measurement use medium information written on a specific track.

Next, the measurement data written on the sector on the specific track is read. The state of this read operation is shown in FIG. 2. The medium information in the figure is information for measurement use written on a specific track shown in FIG. 1. The read gate is produced at the timing $t_{RG}$ of the time interval $T_a$ until the start of the data field on the format. When the read gate is opened, the signal waveform is input to the data read circuit of the read/write channel unit 33.

At the timing $t_{SBW}$ of the time interval $T_b$ anticipating the maximum time difference of the write/read head distance, a sync byte window (SBW) for detecting the sync byte field is opened and the data is read. If the sync byte cannot be detected at the initial sync byte window SBW1, the system waits for one revolution, then again opens a read gate at the timing $t_{RG}$ and opens a sync byte window SBW2 with a broader sync byte window width than initially. This operation is repeated until the sync byte can be detected. FIG. 2 shows that the sync byte is detected at the timing $t_{DA}$ when the sync byte window SBW3 is opened.

Figure 3:
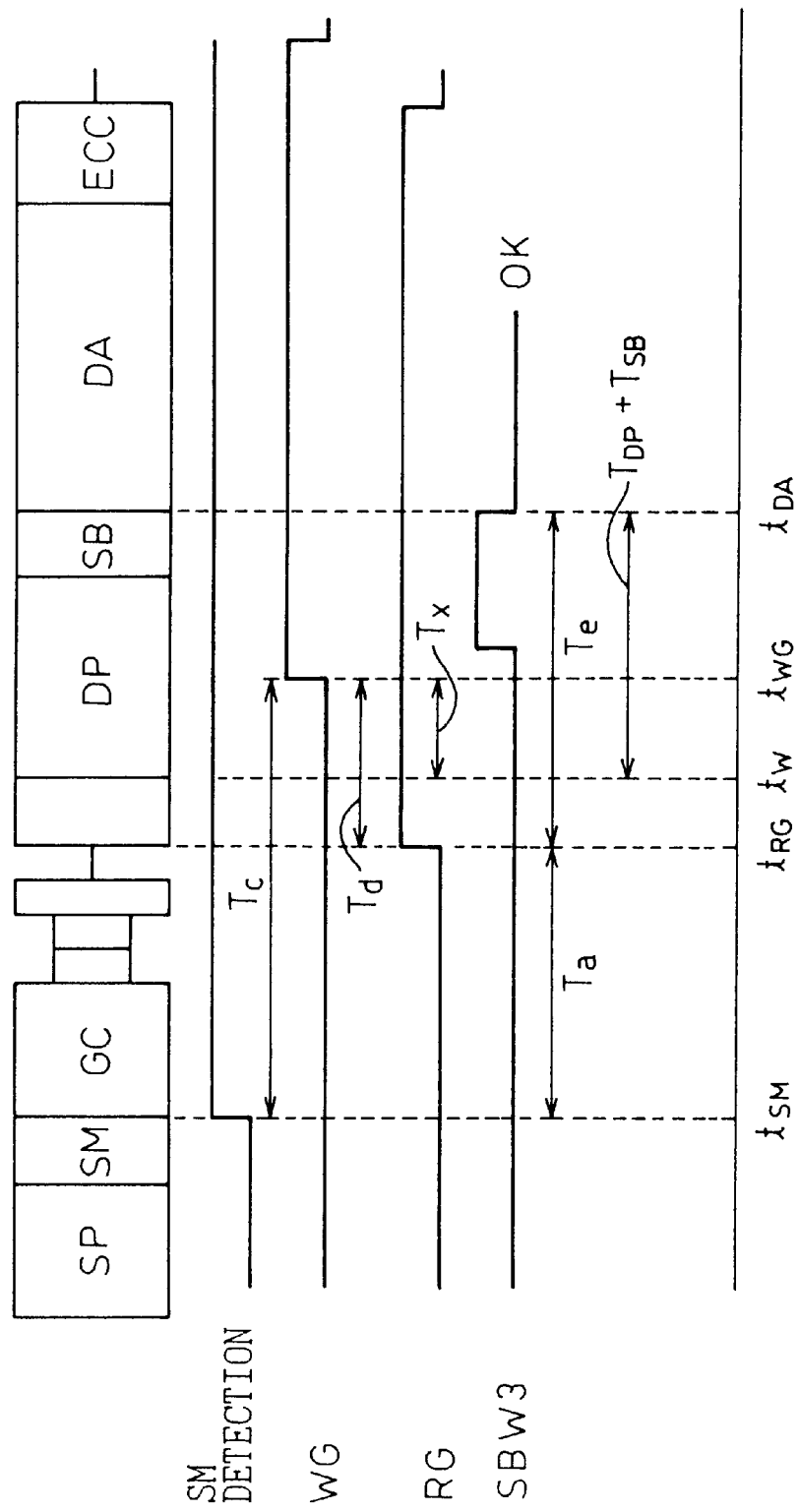
FIG. 3 is a time chart for explaining the method of calculating a write/read (W/R) head distance from the read measurement use medium information.

Therefore, as shown in FIG. 3, the time difference $T_x$ between the write head $H_w$ and the read head Hr can be calculated from the timing $t_{DA}$ and the actual data write timing $t_{WG}$. The equation for this becomes as follows assuming the sync mark/write gate time interval to be $T_c$, the sync mark/read gate time interval to be $T_a$, the read gate/write gate time interval to be $T_d$, and the read gate/sync byte detection time interval to be $T_w$:

$$T_x = (T_c - T_a) - \{T_e - (T_{DP} + T_{SB})\}$$

$T_{DP}$ is the data time of the data preamble field, while $T_{SB}$ is the data time of the sync byte field. These are known. Here, since $T_d = T_c - T_a$, the equation expressing the write/read head distance time difference $T_x$ becomes:

$$T_x = T_d - (T_e - T_{DP} - T_{SB})$$

Note that there may be effects of fluctuation in rotation of the magnetic disk, jitter in the signal timing, etc. By repeating the write and read operations several times and measuring the sync byte position, it is possible to find the sync byte position more accurately and possible to also find the write/read head distance accurately.

Figure 4:
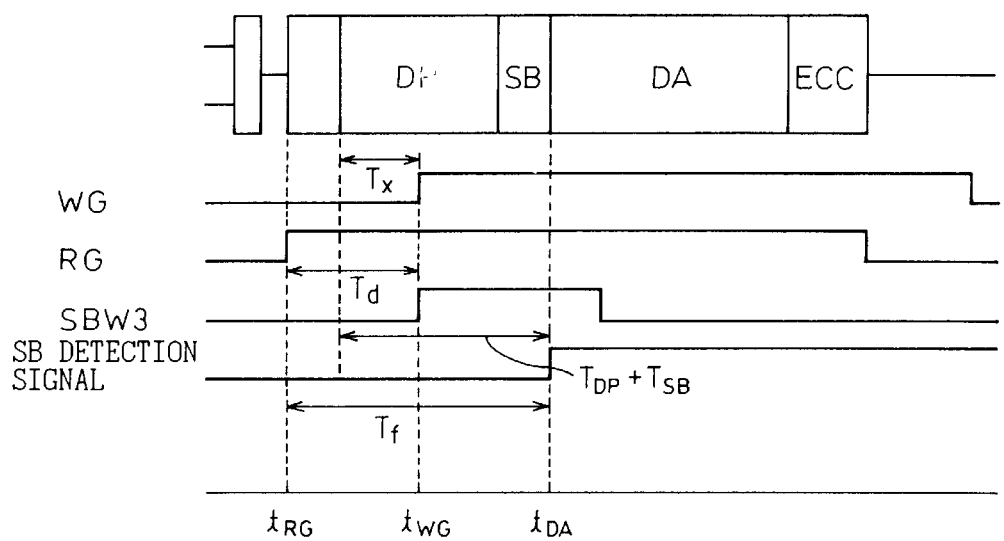
FIG. 4 is a time chart for explaining another method of calculating the write/read head distance from the read measurement use medium information.
Figure 7:
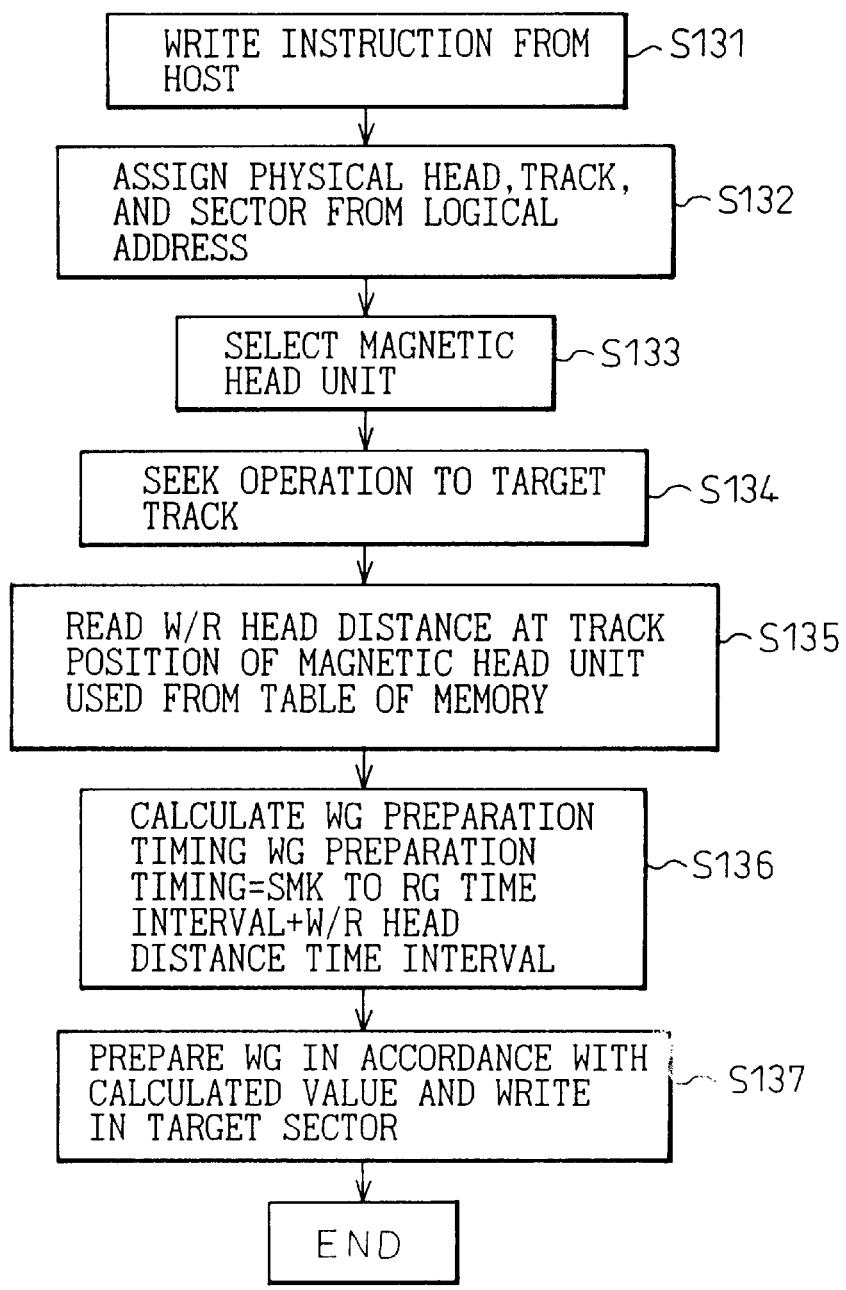
FIG. 7 is a flow chart for explaining the operation of determining a data write timing based on the read write/read head distance.

Next, FIG. 4 shows another example of the method of measurement of the write/read head distance. In the above case, the method of increasing the window width of the sync byte window for each read operation when detecting the sync byte field was adopted, but in the method of FIG. 4, the window width is made large in the initial sync byte window to enable detection of the sync byte with one operation.

As explained above, the width of opening of the sync byte window is not changed with each read operation. The width of opening of the sync byte window is made wide so that the sync byte can definitely enter it. As shown in FIG. 4, when the sync byte window SBW3 is opened, the sync byte detection signal is generated at the timing $t_{DA}$ of detection of the sync byte. Therefore, the time interval $T_f$ from the read gate to the sync byte detection signal is measured and used for calculation of the write/read head distance time difference distance $T_x$. This equation becomes:

$$T_x = T_d - \{T_f - (T_{DP} + T_{SB})\}$$

In the equation, $T_d$, $T_{DP}$, and $T_{SB}$ are known, so if measuring the interval $T_f$, it is possible to find the write/read head distance time difference $T_x$.

As shown in FIG. 26, the relative distance in the track direction between the read head $H_r$ and the write head $H_w$ changes according to the track position due to position error in manufacture of the magnetic head unit. By measuring the write/read head distance time interval $T_x$ of the magnetic head unit, however, it is possible to accurately determine the timing $t_{WG}$ of opening of the write gate for each track. At this time, since the measured write/read head distance time difference $T_x$ includes the positional error in manufacture between the read head $H_r$ and the write head $H_w$, the servo information etc. is never written over due to this positional error. It is possible to reliably and accurately write data to a desired write position for each track. Here, even if not measuring the write/read head distance for all tracks, by measuring several tracks on the magnetic disk and interpolating for the tracks between them based on the measurement results, it is possible to shorten the measurement processing time, possible to write to more accurate positions, and possible to more effectively use the magnetic disk.

Note that in the example explained up to here, reference was made to an example of the method of measurement of the write/read head distance using a sync byte, but the invention is not limited to this method so long as it is possible to measure the time interval between the write head and read head based on information able to specify the timing in the medium information written on the magnetic disk.

Next, an example of the sequence when applying the measured write/read head distance information to a magnetic disk drive system will be explained using the flow charts of FIG. 5 and FIG. 6.

The flow chart of FIG. 5 shows the case of writing write/read head distance information for each track, found based on the measured write/read head distance information, as magnetic head unit-specific information in a specific sector on the magnetic disk.

In this case, when power is turned on in the magnetic disk device 1 (step S101), the microprocessor unit 31 issues a write instruction for a specific sector where the head unit-specific information is to be written on the magnetic disk 21 (step S102).

Next, the servo controller 34 positions the magnetic head unit to the specific sector by a seek operation in accordance with the read instruction (step S103). The read/write channel unit 33 performs a read operation from the read data sent from the head IC 26 (step S104).

Next, the information written as the head unit-specific information is extracted based on the read data and stored in the data buffer memory 36 (step S105). Here, an example of the write/read head distance information included as the head unit-specific information is shown by the following table format:

TABLE

| Track No. | Head 0 | Head 1 |
| --- | --- | --- |
| 0 h - | 100 ns | 200 ns |
| 1000 h - | 150 ns | 250 ns |
| 2000 h - | 200 ns | 300 ns |
| 3000 h - | 220 ns | 330 ns |
| 4000 h - | 250 ns | 360 ns |
| 5000 h - | 230 ns | 350 ns |
| 6000 h - | 210 ns | 330 ns |
| 7000 h - Max | 180 ns | 300 ns |

Here, the track no. is expressed by a hexadecimal number. The case is shown where there are two magnetic head units provided in the magnetic disk device 1. In this way, write/read head distance information is loaded corresponding to the track nos. Further, the write/read head distance values corresponding to the tracks requiring writing of data are read from the table and used for determination of the write timing.

Further, the flow chart of FIG. 6 shows the case where head unit-specific information is not written in a specific sector on the magnetic disk, but is stored in a nonvolatile memory in the magnetic disk device 1.

In this case, first, when the power is turned on in the magnetic disk device 1 (step S121), the microprocessor unit 31 issues a read instruction for the head gap information as the head unit-specific information (step S122).

Next, the write/read head distance information written in the nonvolatile memory as the head unit-specific information is read and stored in the data buffer memory 36 (step S123). The write/read head distance information stored here is similar to that of the above table.

The method of using the write/read head distance information stored in the data buffer memory 36 is similar to the case of FIG. 5. In the case of FIG. 6, however, the write/read head distance information is originally stored in the non-volatile memory, so a seek operation for reading the write/read head distance information is not required as in the case of FIG. 5.

The operations in the above flow chart showed the steps up until acquiring the write/read head distance information. Next, referring to the flow chart of FIG. 7, an explanation will be given of the operation for determining the timing of the write gate and writing the data based on the obtained write/read head distance information.

First, the host system 4 sends a data write instruction to the magnetic disk device 1 (step S131).

The magnetic disk device 1 receives the data write instruction at the hard disk controller 32 and assigns a physical head, track, and sector from the logical address contained based on that instruction (step S132).

When a plurality of magnetic head units are provided in the disk enclosure unit 2, the magnetic head unit corresponding to the logical address is selected (step S133) and the magnetic head unit is positioned at the allocated target track by a seek operation (step S134).

Next, the hard disk controller 32 reads the write/read head distance value at the target track position from the table stored in the data buffer memory 36 for the magnetic head unit used (step S135). The timing $t_{WG}$ of preparation of the write gate signal is calculated based on this head distance value (step S136). This timing $t_{WG}$ is calculated by the following equation from the time interval $T_a$ between the sync mark detection timing and start of the data field on the format and the write/read head distance time difference $T_x$ read from the table:

$$t_{WG}=T_a+T_x$$

The timing $t_{WG}$ is determined by adding the write/read head distance time difference $T_x$ to the time interval $T_a$ in this way because it is assumed that the position of the write head $H_w$ is behind the read head $H_r$. If the positional relationship of the heads is reverse, the timing $t_{WG}$ is found by subtracting the write/read head distance time difference $T_x$ from the time interval $T_a$. By this, it is possible to determine the timing of opening of the write gate by calculation based on the write/read head distance time value read from the table in accordance with the data write instruction (step S137). At step S134, the magnetic head unit is already positioned at the target track by the seek operation, so it is possible to generate the write gate and write the data at a predetermined position of the target sector.

As explained above, since the actual head distance between the write head $H_w$ and the read head $H_r$ in the magnetic head unit used is measured and a write/read head distance time value is produced for every track based on the measured head distance, it is possible to correct a change in the head distance based on the track position using the write/read head distance time value and possible to accurately find the start timing where data can be written.

Further, even when there is a manufacturing difference in the magnetic head unit, the error due to the difference has little effect.

Note that in the first embodiment, as the method for correcting the write/read head distance, the example was shown of correcting the write/read head distance time value by a tabular format, but instead of storage by a tabular format, the method of correction by an n-ary polynomial having the track no. as a function may also be considered.

Second Embodiment

In the first embodiment, the change of the write/read head distance mainly in the rotational circumferential direction of the magnetic disk, that is, the track direction, was corrected. In the second embodiment, the deviation in the radial direction of the magnetic disk, that is, with respect to the adjoining track, is corrected.

As explained above, a magnetoresistive head unit suitable for high bit density recording is used for the magnetic head unit 22 in the magnetic disk device 1 shown in FIG. 23. This magnetic head unit has a separate read head core and write head core, so deviation occurs in the center of the read head core and the center of the write head core due to manufacturing differences. Further, since the magnetic disk, head carriage, and rotation mechanism are used in common, as shown from FIG. 24 to FIG. 26, the angle è between the head unit and track changes depending on the position of the head unit and the amounts of deviation Y from the track of the center of the read head core and the center of the write head core change.

Due to this phenomenon, in the past, the track position was changed to measure the off-track margin and the correction positions were connected by a line to correct the amounts of deviation of the cores. Therefore, the magnetic head unit cores and the amounts of deviation will be explained.

The magnetic disk 21 rotates, so the track draws a circle about the spindle motor 24. On the other hand, the magnetic head unit 22 rotates at the head arm 23 by the voice coil motor 25, is moved in a direction intersecting the circle-drawing track, and is changed in track position. Further, the magnetic head unit 22 is attached with a certain angle to the head arm 23. The centers of the read head core $H_r$ and the write head core $H_w$ are not symmetric to the left and right. Due to the above arrangement, the displacements of the positions of the read head $H_r$ and write head $H_w$ with respect to the track are not simple fixed ones.

Here, when the thickness of the read head $H_r$ is $G_r$, the thickness of the write head $H_w$ is $G_w$, and the distance between the read head $H_r$ and the write head $H_w$ is $G_L$, the distance X between the center of thickness of the read head $H_r$ and the center of thickness of the write head $H_w$ becomes:

$$X=G_r/2+G_w/2+X \quad (1)$$

If the amount of deviation between the center of the read head $H_r$ and the center of the write head $H_w$ is Y, the distance $G_0$ between the center of the read head $H_r$ and the center of the write head $H_w$ becomes:

$$G_0=(X^2+Y^2)^{1/2} \quad (2)$$

Further, when the angle between X and $G_0$ is $\theta_1$, $$\theta_1=\cos^{-1}\{(X^2+G_0^2-y^2)/(2 \cdot X \cdot G_0)\} \quad (3)$$

When the distance from the VCM center to the center of the read head core is B, the distance from the VCM center to the SPM center is C, and the distance from the SPM center to the center of the track is r, the angle $\theta_2$ of the VCM center, the write/read head distance, and the SPM center becomes:

$$\theta_2 = \cos^{-1}\{(B^2 + r^2 - C^2)/(2 \cdot -B^2 \cdot r)\} \quad (4)$$

From the above, the amount of deviation E between the center of the read head $H_r$ and the center of the write head $H_w$ can be expressed as follows:

$$E = r - \{r^2 + G_0^2 + 2 \cdot r \cdot \cos(\theta_1 + \theta_2)\}^{1/2} \quad (5)$$

This equation (5) shows that the amount of deviation E of the read head $H_r$ and write head $H_w$ can be expressed as a function of r (distance from SPM center to on-track center). That is, it shows that the amount of deviation E can be expressed as a function of the track no.

For example, when making the data area the range of 21 mm to 45 mm in the radial direction from the SPM center and making the parameters the following values, from equations (1) to (5), if the amounts of deviation E relating to the read head $H_r$ and write head $H_w$ are graphed as functions of r, the results become as follows:

$G_r = 0.1$ μm $G_w = 0.2$ μm $G_L = 40$ μm $A = 0.6$ μm $B = 50.0$ mm $C = 60.0$ mm

Here, the explanation will be given of the case of dividing the data area into four equal parts, measuring the off-track margin at tracks of five locations, and using the results for correction of the amounts of deviation. In the past, for the curve shown in FIG. 8, five points were connected by lines and the four lines used as the amounts of deviation. In the case of using such lines, graphing the correction error with respect to the r position gives FIG. 9. According to this figure, originally speaking, the correction error should become 0 (m), but in fact the further inward, the greater the error that remains.

To reduce the error by linear interpolation, the method of increasing the measurement points may be considered, but if the measurement points are increased, the time occupied in the shipment testing process becomes greater, so this is not suitable for mass production.

Figure 8:
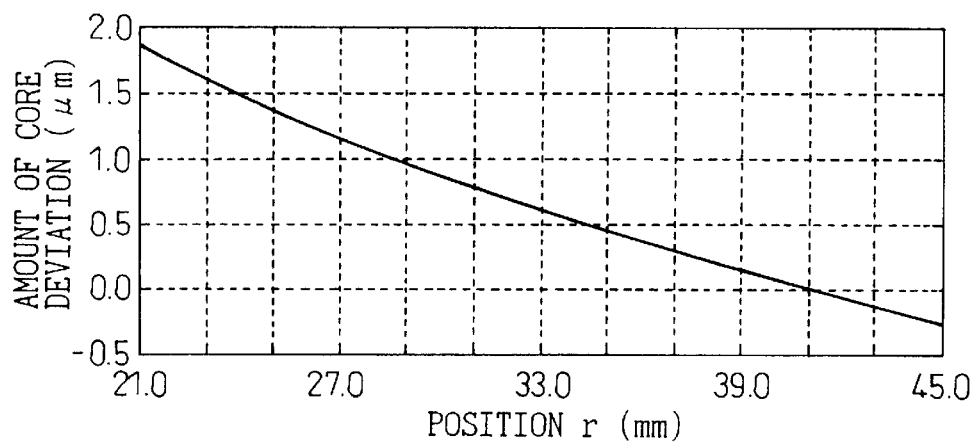
FIG. 8 is a graph of the state of change of the amount of core deviation in the radial direction of a disk between a core center of a write head and a core center of a read head in accordance with a track position.
Figure 9:
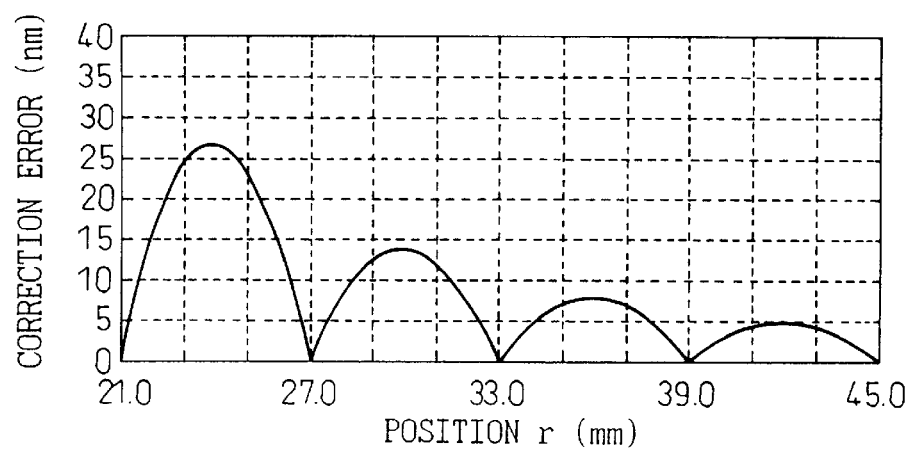
FIG. 9 is a graph of correction error in a radial direction of a disk in the case of five-point linear correction of a change of the amount of core deviation shown in FIG. 8.
Figure 10:
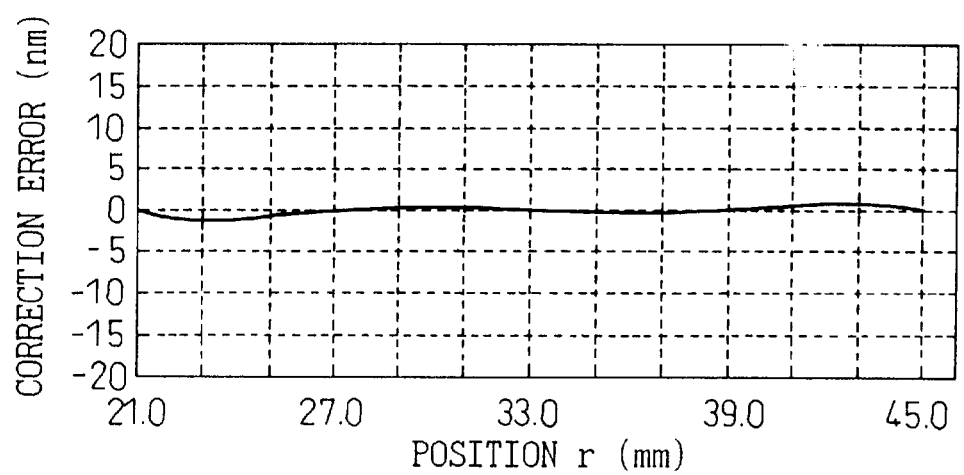
FIG. 10 is a graph of correction error in a radial direction of a disk in the case of quadrary polynomial correction using five-point measurement of a change of the amount of core deviation shown in FIG. 8.

Therefore, in the second embodiment, rather than increasing the number of measurement points, an n-ary polynomial passing through the measurement points is found so as to approach the curve shown in FIG. 8 and correction made based on the polynomial found. A graph showing the correction error when correcting by a quadrary polynomial the same measurement points as the five point linear correction enabling error compression is shown in FIG. 10. Referring to the correction error graph of FIG. 10, it is learned that the correction error is greatly reduced compared with the case of linear correction shown in FIG. 9.

In the n-ary polynomial used here, the quadrary polynomial E is expressed as:

$$E = a \cdot r^4 + b \cdot r^3 + c \cdot r^2 + d \cdot r + e \quad (6)$$

The order is suitably selected so that the correction error becomes as close to 0 as possible. Further, the track nos. of the measurement points are entered for the variable r to calculate the parameters a to e from simultaneous equations. These parameters are stored. When performing a seek operation, the parameters are used for calculating the core deviation correction values.

When applying the deviation correction method using an n-ary polynomial, first, the off-track margin for each magnetic head unit is measured at the correction track position. Further, the amounts of deviation of the read head core and write head core at the track positions are measured. From the results, the parameters, that is, the order and coefficients in the correction polynomial (if equation (6), the parameters a, b, c, d, and e), are found, and the parameters are recorded as correction data in the form of a correction table in a specific sector of the magnetic disk. When turning on the power, the parameters are read from the specific sector and the correction table loaded into the memory. When a read instruction is received, the correction table of the magnetic head unit is read from the memory, the amount of deviation from the track position is calculated, and the amount of offset at the on-track time is determined.

The operation in the case of application of this system to a magnetic disk device is shown from FIG. 11 to FIG. 15.

Figure 11:
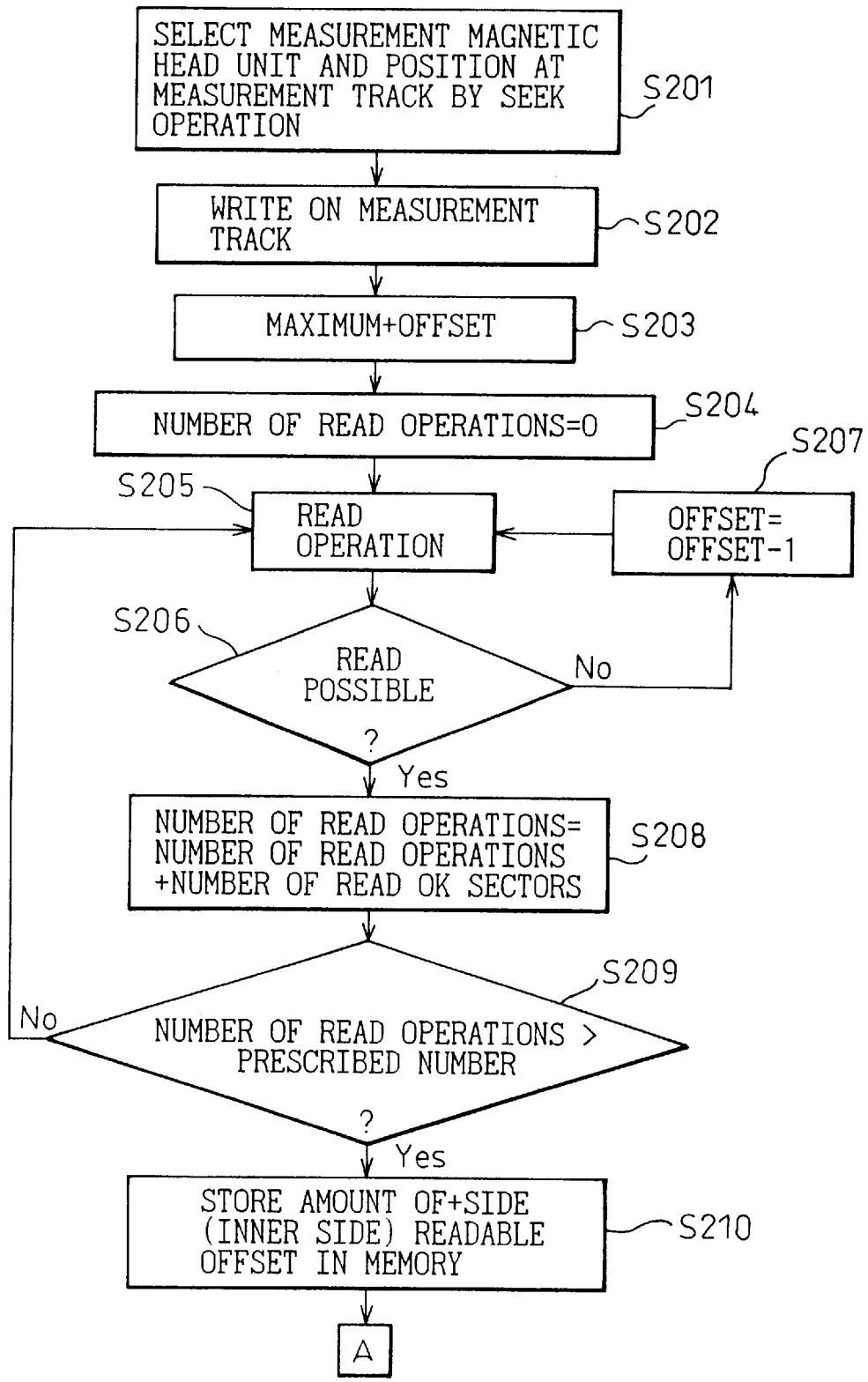
FIG. 11 is a flow chart of the routine of processing for measuring an off-track margin of a magnetic head unit.
Figure 12:
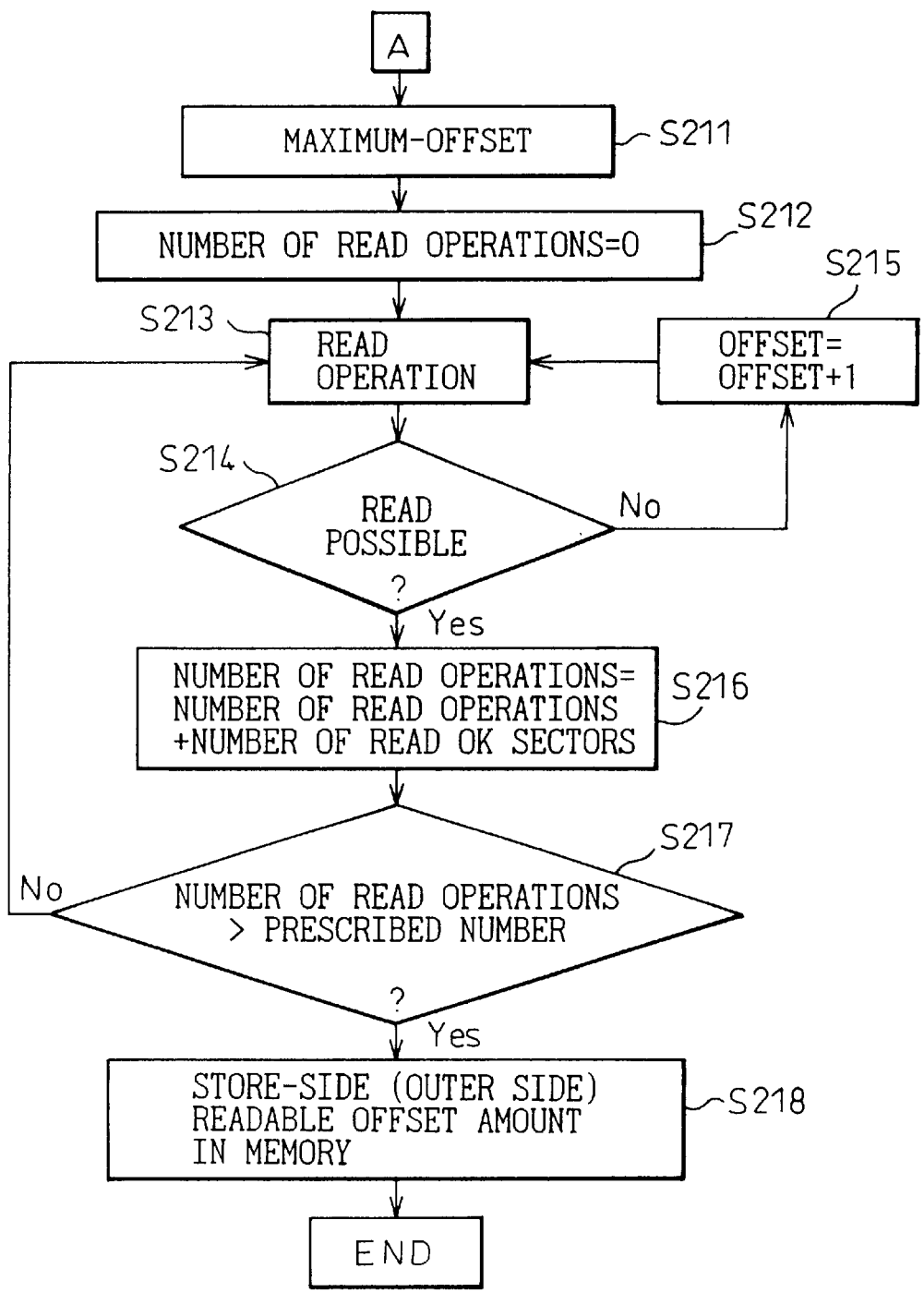
FIG. 12 is a flow chart of the routine of processing for measuring an off-track margin continuing from FIG. 11.

In the flow charts of FIG. 11 and FIG. 12, the operation in the case of measuring the off-track margin for each magnetic head unit at the correction track position is shown. The flow chart of FIG. 11 shows the case of measuring the correction track position from the inner side when measuring the off-track margin, while the flow chart of FIG. 12 shows the case of measuring it from the outer side.

In the flow chart of FIG. 11, first, the magnetic head unit to be measured is selected and the magnetic head unit is positioned at the measurement track by a seek operation (step S201). The measurement track is only for measurement. After measurement is finished, it is written over by other data. Therefore, it is possible to select any track. For example, it is also possible to use the track on which the specific sector is recorded. The magnetic head unit is positioned on the measurement track or near the measurement track.

When the seek operation of the magnetic head unit is performed, the measurement data is written on the measurement track by the write head $H_w$ (step S202).

Next, considering from where the measurement data can be read the most by the magnetic head unit, the amount of offset is added and the magnetic head unit is positioned by a seek operation (step S203). Here, since the measurement is conducted from the inner side, the offset is given at the side where the track no. is increased.

Then, the number of read operations is set to 0 (step S204) and the read operation started by the read head $H_r$ (step S205).

First, at that position, it is judged whether the measurement data could be read (step S206). When the measurement data could be read (YES), it is assumed that there was one read OK sector and 1 is added to the number of read operations (step S208).

On the other hand, when the measurement data could not be read (NO), the amount of offset is decreased by 1 so as to reach the side able to read the measurement data (step S207). Next, at step S205, the read operation is performed at a position of an amount of offset smaller by 1. In this way, the read operation is repeated until the measurement data can be read at the position offset by 1 for each revolution of the magnetic disk.

At step S208, the number of read OK sectors is counted for every revolution of the magnetic disk 1 at the specific offset position reduced by 1. It is judged if the count has become the prescribed read OK number (step S209). This considers the causes of fluctuation in the rotation mechanism of the magnetic disk etc.

Therefore, when the number of read operations of read OK sectors does not reach the prescribed number (NO), the routine returns to step S205, where a read operation is performed at the specific offset position. This read operation is repeated until the prescribed number. Further, when the number of read operations of read OK sectors reaches the prescribed number (YES), it is considered possible to read the measurement data at the inner side and the amount of specific offset at that time is stored in the memory (step S210).

In the above measurement of the off-track margin, the amount of offset was given at the inner side, but sometimes it is not possible to obtain a grasp of the state of reading the measurement data. If measuring the off-track margin by offset to the outer side, it is possible to find the offset width of the same error rate. Therefore, it is sufficient to make the sector of that width the offset value.

The flow chart of FIG. 12 shows the operation of measurement of the off-track margin offset to the outer side. The operation for measurement of the off-track margin in the flow chart of FIG. 12 is performed after the operation by the flow chart shown in FIG. 11. Compared with the operation by the flow chart shown in FIG. 11, the basic processing routine is the same.

In the operation shown in FIG. 12, however, the offset is given not at the inner side, but the outer side, so at step S211, the track no. is reduced at the outer side, while at step S215, the amount of offset is reduced by exactly 1 unlike in the operations at step S201 and step S207 of FIG. 11.

Figure 13:
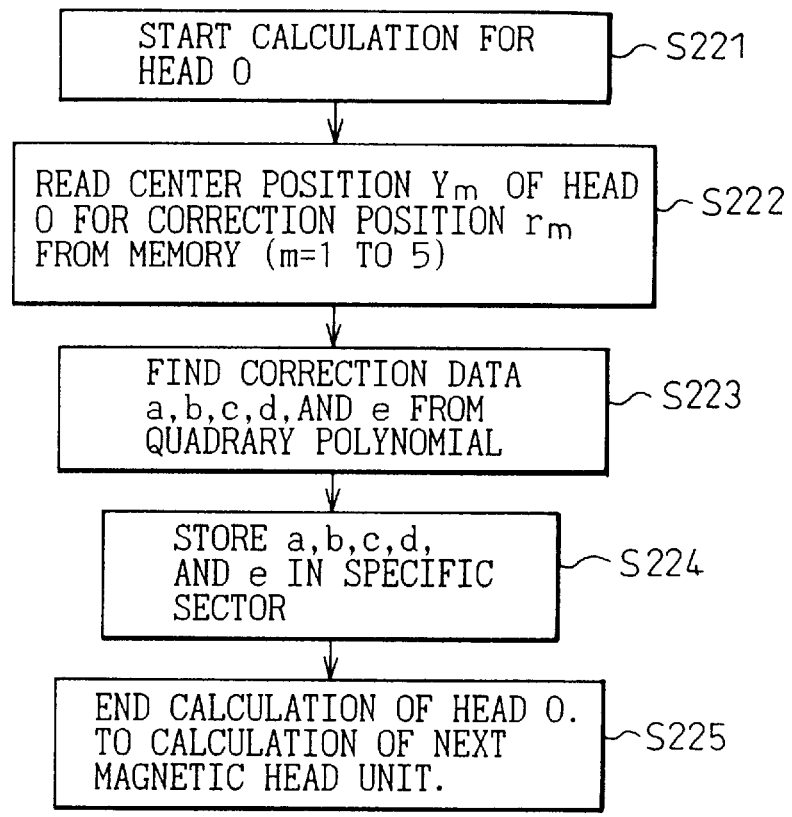
FIG. 13 is a flow chart for explaining the flow of processing for calculating a correction value in the case of use of quadrary polynomial correction using five-point measurement.

Next, the operation for calculating the correction value by the n-ary polynomial of equation (6) will be explained with reference to the flow chart of FIG. 13. In FIG. 13, the example is shown of n=4, that is, use of a quadrary polynomial. Measurement is conducted at five points in the width of the data area of all tracks.

First, the head 0 is selected to start the calculation from the magnetic head unit near the printed circuit board (step S221).

Next, the center position $Y_m$ of the head 0 with respect to the correction position $r_m$ is read from the memory (step S222). m shows the number of measurement points and is a value from 1 to 5.

Next, based on the read center positions $Y_1$ to $Y_5$, the parameters a, b, c, d, and e included in the polynomial are calculated using the quadrary polynomial shown in equation (6) (step S223). The calculated parameters a, b, c, d, and e are stored as correction data in a specific sector on the magnetic disk (step S224).

Here, since the parameters for correction are stored for the head 0, when finishing calculation of the parameters for the head 0 and there is another magnetic head unit, for example, when there is a head 1, the parameters are calculated for the head 1 as well in the same way as for the head 0 and the results stored in the specific sector.

The operation shown up to now in FIG. 13 finds the amount of core deviation E of the read head $H_r$ and the write head $H_w$ in the radial direction of the magnetic disk, so the correction polynomial is specified for each magnetic head unit. Therefore, an explanation will be made of an operation for correction based on the amount of core deviation by the correction polynomial in a magnetic disk device.

Figure 14:
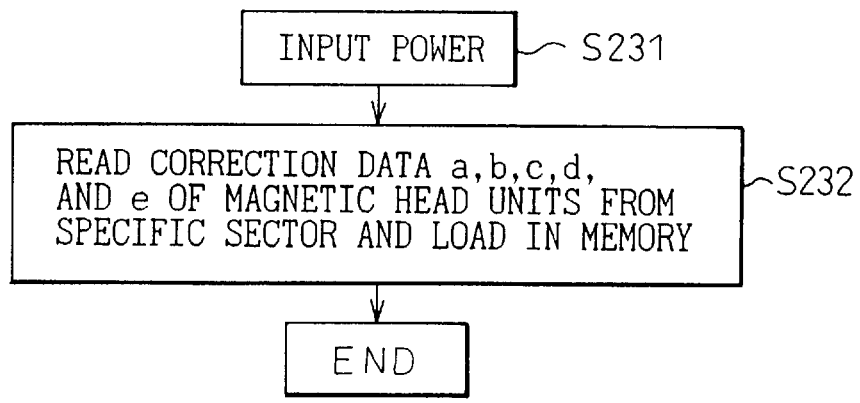
FIG. 14 is a flow chart for explaining the flow of processing at the time of turning on the power in the case of use of quadrary polynomial correction using five-point measurement.

The flow chart shown in FIG. 14 shows the operation for correction when turning on the power of the magnetic disk device. First, when the power is turned on (step S331), the magnetic head unit is positioned at the track at which the specific sector is present by a seek operation, the correction parameters a, b, c, d, and e for the magnetic head units are read from the specific sector, and the correction parameters are loaded into the memory linked with the magnetic head units.

Next, for each seek operation of the magnetic head unit, the parameters for the magnetic head unit are read from the memory, the amount of core deviation is calculated using the n-ary polynomial based on these parameters, and the position of the magnetic head unit is controlled by that data.

Figure 15:
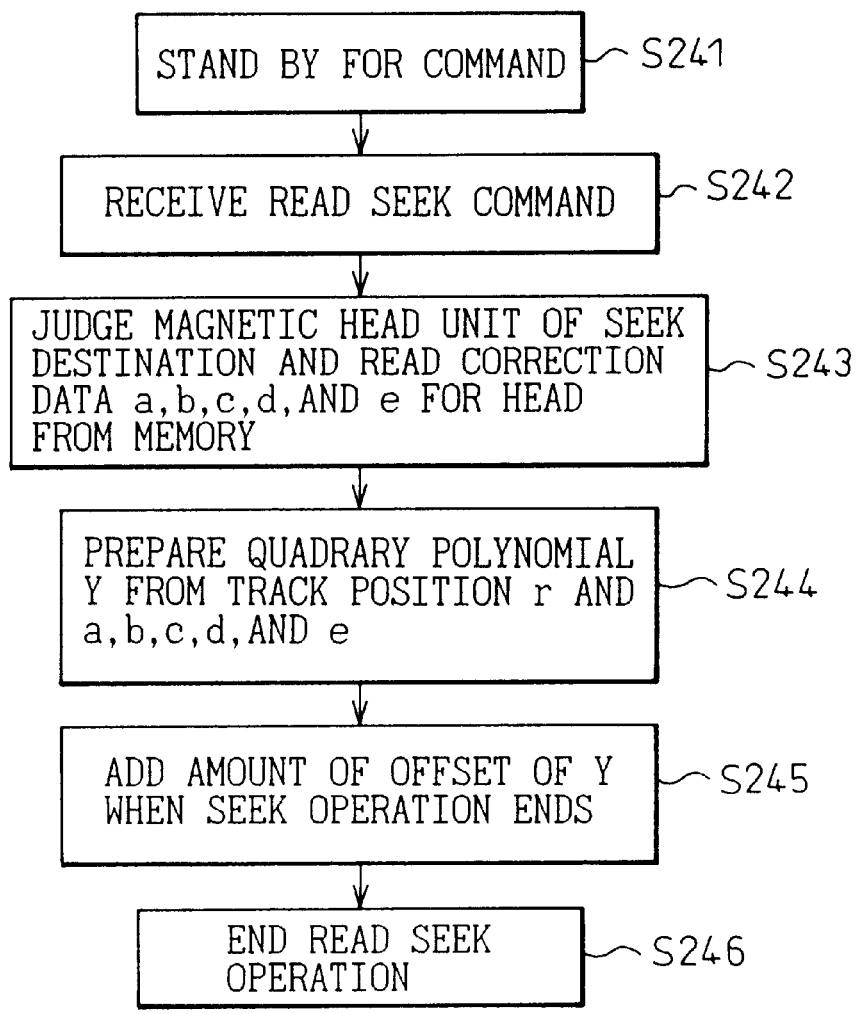
FIG. 15 is a flow chart for explaining the flow of processing when receiving a read instruction in the case of use of quadrary polynomial correction using five-point measurement.
Figure 16:
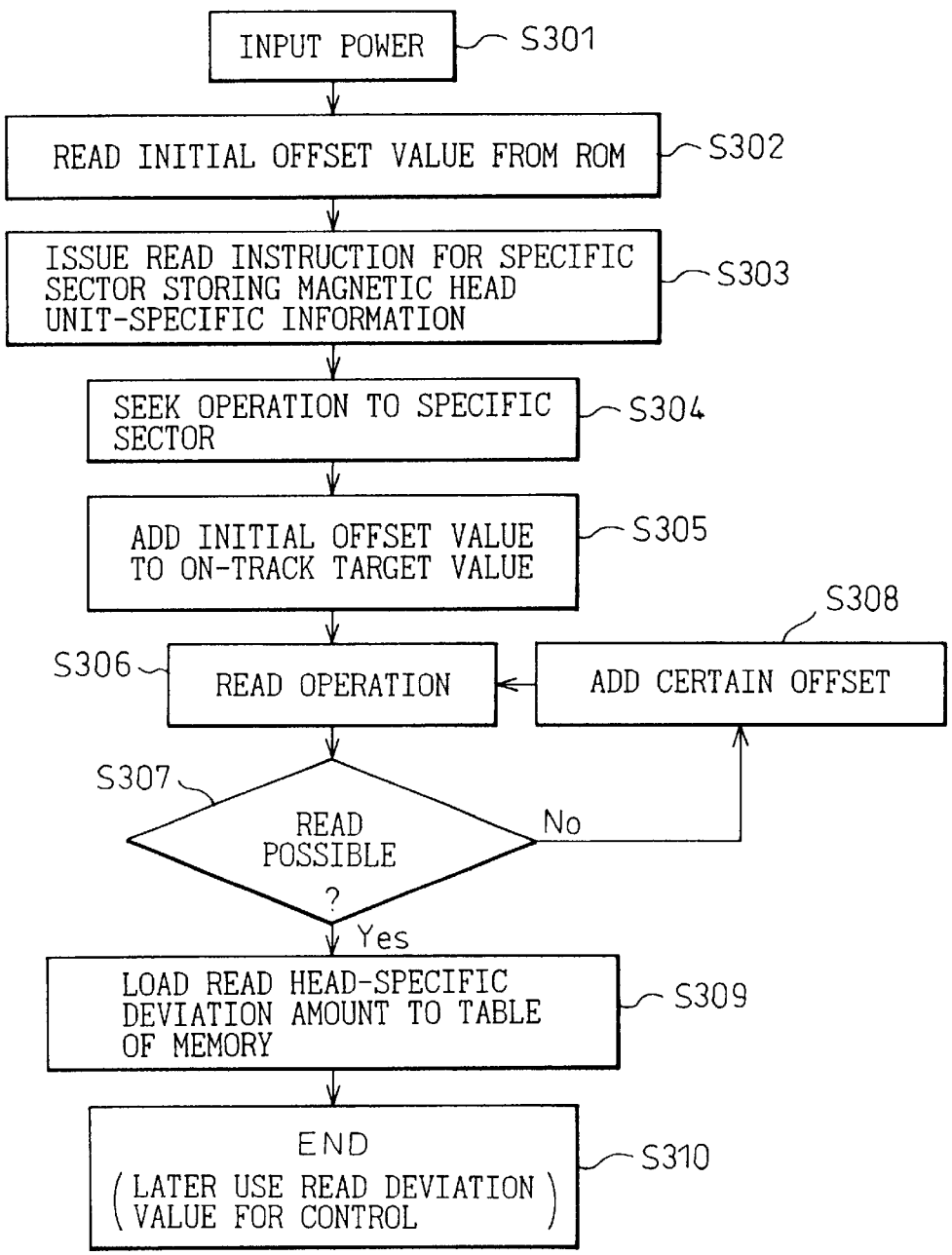
FIG. 16 is a flow chart for explaining the processing for re-reading offset by a magnetic head unit at the time of turning on the power.

Here, the operation when the magnetic disk device 1 receives a read instruction from the host system 4 is shown in the flow chart of FIG. 15.

When the hard disk controller 32 of the magnetic disk device 1 is in a state standing by for an instruction (step S241), it receives a read seek instruction from the host system 4 (step S242).

Then, it is judged which magnetic head unit is to be positioned by a seek operation in accordance with the received instruction. The correction data a, b, c, d, and e are read from the memory as the correction data for the judged magnetic head unit (step S243). The microprocessor unit 31 finds the amount of core deviation Y at the destination of the seek operation by the n-ary polynomial based on the read parameters (step S244).

Next, the magnetic head unit is positioned by a seek operation and the amount of offset corresponding to the amount of core deviation Y is added for correction (step S245). By this, the read seek operation of the magnetic head unit based on the read instruction is completed (step S246).

Due to the above processing, it is possible to prepare a correction equation using an n-ary polynomial for the track position from the amounts of core deviation of the write head and read head measured at a plurality of track positions on the magnetic disk and correct the amount of core deviation of the magnetic head unit corresponding to the track position for each seek operation of the magnetic head unit, so it is possible to absorb the error in manufacture relating to the amount of deviation between the write head and read head specific to the magnetic head unit.

Further, as the correction method, it is possible to employ an n-ary polynomial to reduce the correction error even with a small number of measurements of the off-track margin. Further, it is possible to reduce the correction data stored in the memory.

Note that it is also possible to hold the amount of deviation as a correction table and calculate the order of the correction polynomial after a seek operation etc. when turning on the power.

Third Embodiment

In the magnetic disk drive system according to the second embodiment, a correction use n-ary polynomial based on the amounts of core deviation between the write head and read head measured at a plurality of track positions was used to correct the amount of core deviation of the magnetic head unit corresponding to the track position and absorb the error in manufacture relating to the amount of deviation of the write head and read head specific to the magnetic head unit.

Therefore, in the third embodiment, to absorb the error in manufacture relating to the amount of deviation between the write head and read head specific to the magnetic head unit, the amount of core deviation between the write head and the read head is measured and, at the time of writing data, the data is written by shifting by exactly that amount of core deviation.

As explained above, a magnetoresistive head unit is suitable for high bit density recording, but since the read head core and write head core are arranged separately, a deviation occurs between the center of the read head core and the center of the write head core due to manufacturing differences. Further, in a magnetic disk device, since a rotation mechanism is used, according to the position of the magnetic head unit, the angle between the magnetic head unit and track changes and the amounts of deviation from the track of the center of the read head core and the center of the write head core also change.

As shown in FIGS. 24A and 24B, the magnetoresistive head unit 22 has a separate read head core $H_r$ and write head core $H_w$. When using the magnetic head unit, the read head $H_r$ must be made to move to the position where the data is written or else reading is impossible, so at the time of a read operation, a seek operation is performed adding the offset of the amount of deviation Y of the write head $H_w$ and read head $H_r$. The magnetic head unit is extremely small, so it is impossible in manufacture to eliminate these differences in the amount of deviation Y.

Therefore, in the past, the track position has been changed and the off-track margin measured to correct the amount of deviation between cores. To obtain the best positioning precision at the time of a write operation, at the time of a write operation, the read head core is positioned at the center of the target track to write the data, while at the time of a read operation, the offset of the amount of deviation of the cores is given to bring the read head core to the write position.

Figure 18:
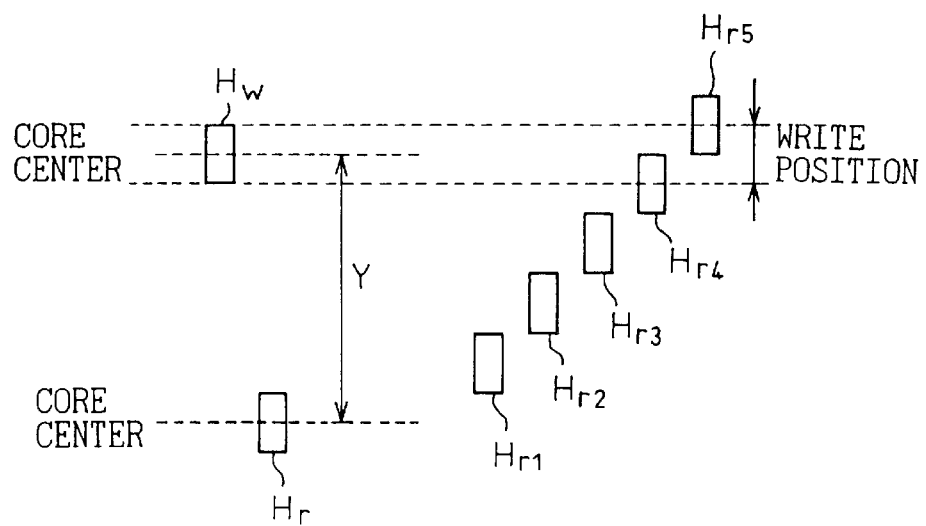
FIG. 18 is a view of the state when not able to re-read offset in the case of a small core width of a magnetic head unit.

Here, the operation at the time of turning on the power when correcting the amount of deviation in the related art will be shown by the flow chart of FIG. 18.

When the power is turned on (step S301), a read instruction for a specific sector storing the hardware specific information is given (step S302). The microprocessor unit 31 judges the instruction (step S303), initiates the seek operation, and positions the magnetic head unit to the track with the specific sector (step S304).

The magnetic head unit starts the read operation of the sector, but the amount of offset used at that time is the initial value held in the ROM (step S305). This initial value is common for all products. The actual amount of core deviation, however, varies between products. Therefore, when not able to read the data the first time (step S306 and NO at step S307), it starts an operation to find the specific sector by reading while adding a predetermined amount of offset (step S308).

Figure 17:
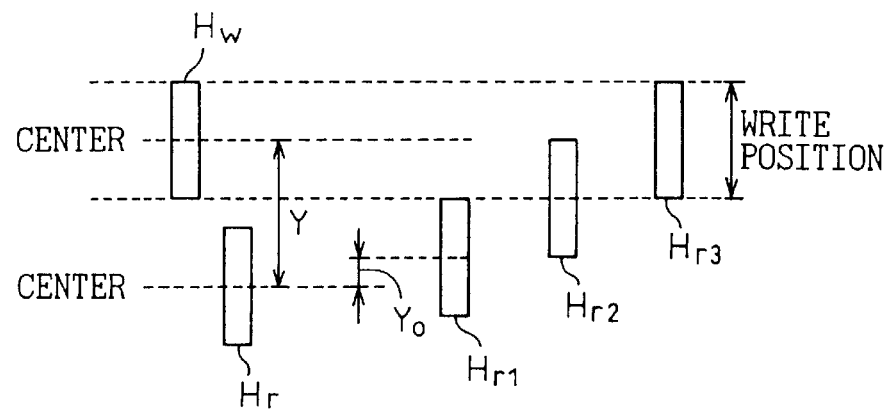
FIG. 17 is a view for explaining the state of operation for re-reading offset by a magnetic head unit.

Here, the operation for finding the specific sector is shown in FIG. 17 and FIG. 18. In the figures, for simplification of the illustration, the write head $H_w$ and the read head $H_r$ are made the same size, while $H_{r1}$, $H_{r2}$, $H_{r3}$ . . . show the positions where the magnetic head unit $H_r$ is made to move to by shifting it by exactly the predetermined amount of offset for each revolution of the magnetic disk.

Figure 19:
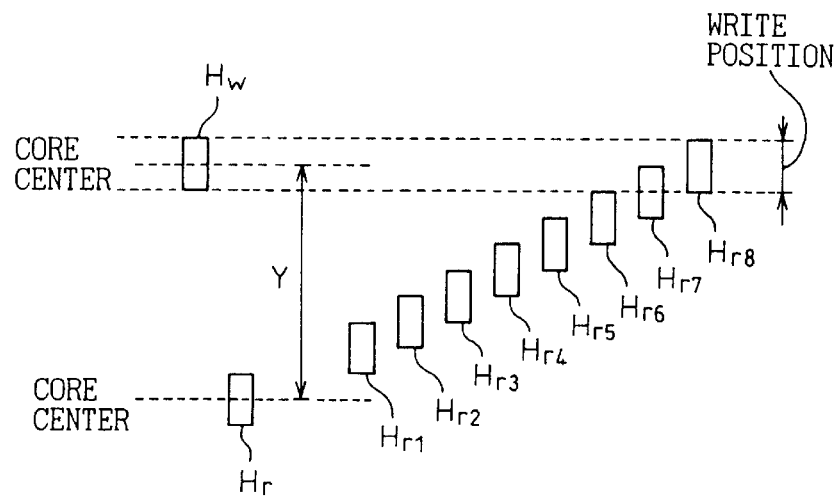
FIG. 19 is a view for explaining the state when able to re-read offset in the case of a small core width of the magnetic head unit and reducing the amount of offset.

FIG. 17 shows the state where the read head $H_r$ moves to the write position of the data written by the write head $H_w$ and reads the data written by the write head $H_w$ at the position of $H_{r3}$. As shown in FIG. 18, however, if the width of the read head core $H_r$ is small, it sometimes cannot be positioned at the write position and the specific sector cannot be found. Further, as shown in FIG. 19, the increments of offset can be reduced to prevent this, but the number of the re-read operations would end up increasing and a large amount of time would be required until normal startup after turning on the power.

Therefore, in the third embodiment, note is taken of the fact that the amount of deviation Y of the write head $H_w$ and the read head $H_r$ is information specific to the hardware including the manufacturing error. The amount of deviation Y is measured using the off-track margin and data written shifted by exactly the amount of offset based on this measurement. Note that the processing for measuring the off-track margin is performed in accordance with the routine shown in the flow charts of FIG. 11 and FIG. 12.

Figure 20:
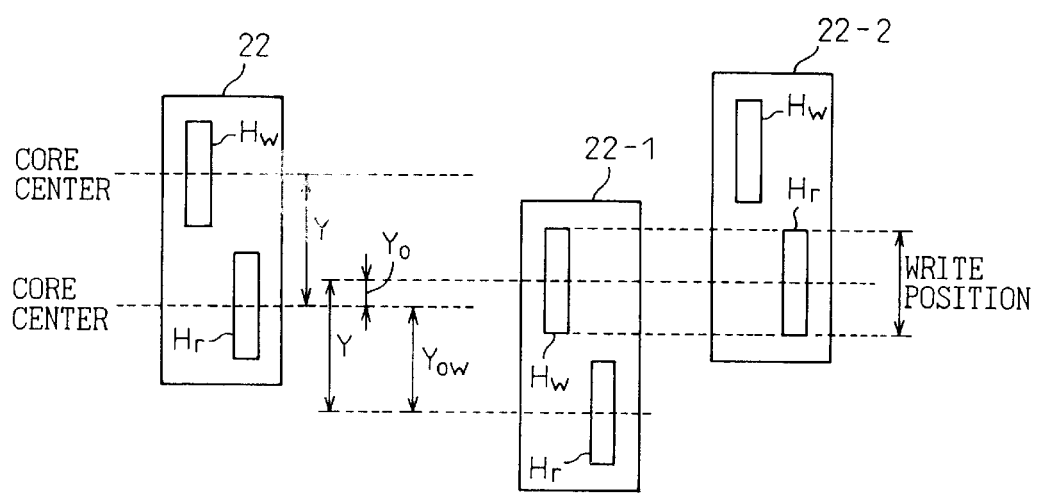
FIG. 20 is a view for explaining write and read operations based on a system controlling the position of a magnetic head unit with respect to a magnetic disk according to an embodiment of the present invention.

An outline of the control system for the magnetic head unit according to this embodiment is shown in FIG. 20. Here, the magnetic head unit 22 has a write head $H_w$ and a read head $H_r$. These are arranged separated from each other by exactly the amount of core deviation Y in the radial direction of the magnetic disk. The amount of core deviation Y is a hardware-specific value including the manufacturing error and is obtained by measurement of the off-track margin. It is stored in the magnetic disk device.

The example shown in FIG. 20 is the case where an initial offset value $Y_0$ for correction of core deviation is stored in a ROM of the magnetic disk device. The initial offset value $Y_0$ shows the amount of deviation in the radial direction from the center of the read head $H_r$. Therefore, the write offset amount $Y_{0w}$ is found from the center of the read head $H_r$ when writing data. This write offset value $Y_{0w}$ is the difference between the measured amount of core deviation Y and the initial offset value $Y_0$ and is found by signed calculation by the equation $Y_{0w}=Y+Y_0$.

When writing hardware-specific information on that track, the magnetic head unit is positioned on the track and then offset by exactly the write offset value $Y_{0w}$ from that position. After this offset, the information is written by the write head $H_w$. The write position written at by the write head $H_w$ is shown by the broken line in FIG. 20.

Next, when reading the hardware-specific information written at the write position, the magnetic head unit is positioned on the track and the magnetic head unit is offset in the radial direction by exactly the initial offset value $Y_0$. After the offset, the position in the radial direction of the read head $H_r$ matches with the write position where the information is written, so the data can be read.

According to this position control system of a magnetic head unit, since data is written offset so as to enable reading by just shifting to the initial offset value, re-reading does not arise and the system can be started up instantaneously. Since data is written by the offset of the write offset value including hardware-specific error, it is possible to eliminate the effect of any manufacturing differences in the magnetic head unit.

Figure 21:
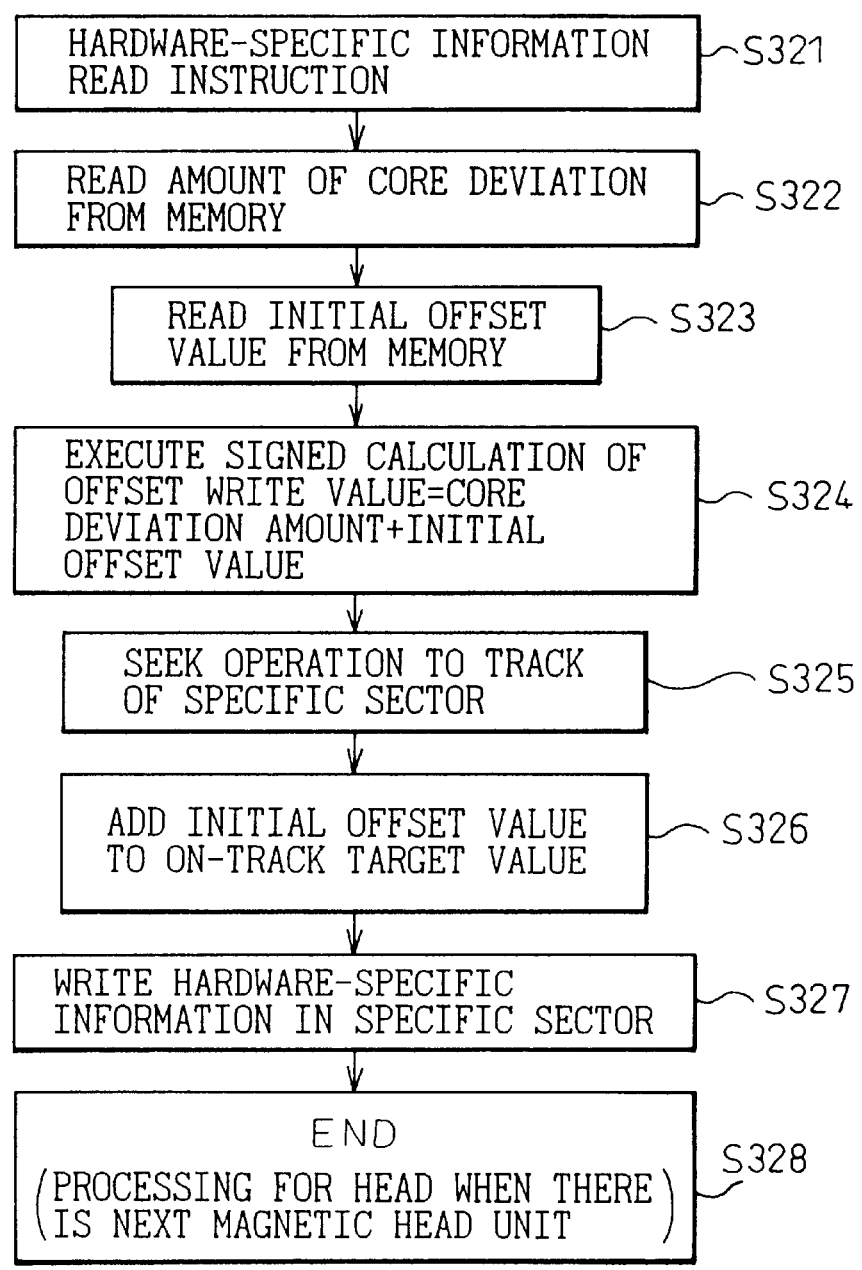
FIG. 21 is a flow chart for explaining processing for writing hardware-specific information in accordance with the magnetic head unit position control system shown in FIG. 20.

Next, the write operation for hardware-specific information according to the present embodiment is shown in the flow chart of FIG. 21. First, when a write instruction for the hardware-specific information is issued (step S321), the amount of core deviation found by measurement of the off-track margin is read (step S322), then the initial offset value is read from the ROM of the device (step S323).

Next, to find the write offset value $Y_{0w}$, signed addition of the amount of core deviation and the initial offset value is executed (step S324).

Next, the magnetic head unit is positioned at the track of the specific sector by a seek operation (step S325), then the magnetic head unit is moved in the radial direction to the position of the found write offset value added to the on-track target value.

When the magnetic head unit is offset to the position of the write offset value from the on-track target value, the hardware-specific information is written in the specific sector (step S327). When this write operation ends, the write operation of the hardware-specific information for the magnetic head unit ends. Further, when a plurality of magnetic head units are provided, the routine shifts to the write operation for the hardware-specific information for the next magnetic head unit.

Figure 22:
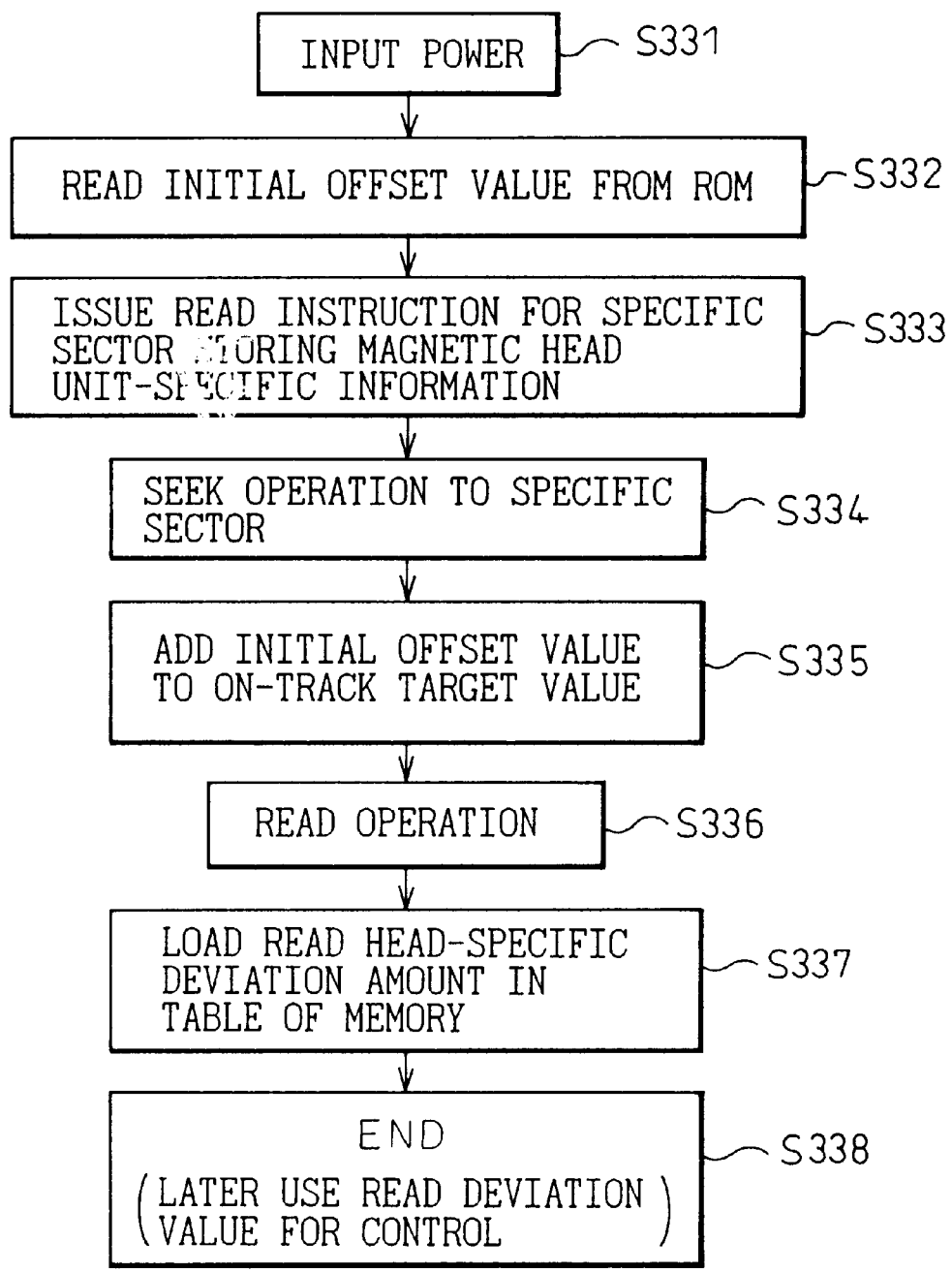
FIG. 22 is a flow chart for explaining processing for reading hardware-specific information at the time of turning on the power in accordance with the magnetic head unit position control system shown in FIG. 20.

Next, the operation for reading the hardware-specific information at the time of turning on the power in the position control system for a magnetic head unit of the present embodiment will be explained using the flow chart of FIG. 22.

First, when the power is turned on (step S331), the initial offset value is read from the ROM (step S332). Next, a read instruction for a specific sector on the magnetic disk where the magnetic head unit-specific information is stored is issued (step S333).

The magnetic head unit is positioned by a seek operation in accordance with the read instruction using the track position where the specific sector is present as the target value (step S334). At this time, the read initial offset value is added to the on-track target value and the magnetic head unit is offset (step S335).

Therefore, since the position of the read head $H_r$ of the magnetic head unit matches with the write position by the write head $H_w$, the hardware-specific information in the specific sector is read by the read head $H_r$ (step S336). Further, the read amount of core deviation specific to the magnetic head unit is loaded into the table of the memory (step S337).

With this, the flow chart of the read operation of the hardware-specific information at the time of turning on the power of the system ends. After the amount of core deviation specific to the magnetic head unit is loaded in the table, the amount of core deviation is used for the positional control of the magnetic head unit (step S338).

Since the position control system for a magnetic head unit in a magnetic disk device is configured as explained above, even wen the write core width is small due to the higher track density, the amount of core deviation with respect to the track width becomes greater, and an initial offset value using the design target or manufacturing average is used, there is no longer a need for re-reading the offset until finding the specific sector where the magnetic head unit-specific core deviation amount is stored, and the information of the specific sector can be read instantaneously at the time of startup. Further, no special nonvolatile memory is required for storing the magnetic head unit-specific information.

According to the magnetic disk drive system of the present invention, since the gap between the write head and read head in the magnetic head unit is measured using the actual magnetic head unit, it is possible to obtain a grasp of the hardware-specific information due to manufacturing differences, fluctuation in rotation, etc. and possible to precisely control the timing of writing or reading by the magnetic head unit or track position of the magnetic head unit.

Further, since the distance between the write head and the read head in the track direction is calculated, performing the write operation at a timing in accordance with this distance not only enables the manufacturing error of the write/read head distance to be absorbed, but also enables the overwriting of servo information etc. to be prevented and the timing of writing of data to be accurately determined. Therefore, there is no longer a need to give a time margin to the format of the magnetic disk and the format efficiency can be improved corresponding to the higher bit densities.

Further, according to the magnetic disk drive system of the present invention, in the control of the track position in the disk radial direction for the seek operation of the magnetic head unit, by correcting the track positions using an n-ary polynomial for a plurality of measurement points measuring the amount of core deviation between the write head and the read head, it is possible to greatly reduce the error arising due to correction compared with linear correction. The amount of core deviation is therefore suitably corrected.

Therefore, the spread of writing by the write head to the adjoining track is suppressed and the error rate can be reduced. Further, the number of measurement locations of the amount of core deviation can be reduced and therefore the strain on the storage memory can be eliminated. Further, there is no longer any strain on the time in the test process in the manufacture of the magnetic disk device and efficient production becomes possible.

Further, according to the magnetic disk drive system of the present invention, the amount of core deviation in the disk radial direction between the write head and the read head is measured and hardware-specific information including the amount of core deviation is written in a specific sector at a write position offset based on the amount of core deviation and initial offset value. When receiving a read instruction for the hardware-specific information, it is possible to make the position of the read head match the write position by just offsetting the magnetic head unit by adding the initial offset value to the on-track target value. Therefore, when turning on the power of the system, there is no longer a need for re-reading the offset of the hardware-specific information by the read head and the system can be started up instantaneously.

Further, the initial offset value used is originally stored in the ROM, while the measured hardware-specific information is written in a specific sector of the magnetic disk. Therefore, there is no need for use of a specially provided nonvolatile memory, the firmware can be incorporated in the mask ROM, and the cost can be reduced.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2002-44843, filed on Feb. 21, 2002, the disclosure of which is expressly incorporated herein by reference in its entirety.

What is claimed is:

1. A magnetic disk drive system wherein a magnetic head unit able to move over a rotating magnetic disk in the radial direction of the disk has a write head and a read head arranged in parallel a certain distance from each other and can write data on the magnetic disk or read data from the magnetic disk, said magnetic disk drive system provided with:

a write/read head distance measuring means for measuring head distance information between said write head and said read head, a storage means for storing said measured write/read head distance information, and a control means for correcting an operation of said magnetic head unit based on said write/read head distance information read from said storage means.

2. A magnetic disk drive system as set forth in claim 1, wherein said write/read head distance information is stored in specific sector at a predetermined track position on the magnetic disk.

3. A magnetic disk drive system as set forth in claim 1, wherein said write/read head distance information is stored in a nonvolatile memory provided in the system.

4. A magnetic disk drive system as set forth in claim 1, wherein at a predetermined write start timing, said write/read head distance measuring means instructs writing of measurement use write information in a sector selected for measurement by said write head at a first timing, then reads said write information by said read head, detects predetermined positional information included in said write information, and produces a second timing.

5. A magnetic disk drive system as set forth in claim 4, wherein said write/read head distance measuring means subtracts a time interval between said first timing and write start timing from a time interval between the first timing and second timing to measure the write/read head distance in a track direction of said magnetic head unit.

6. A magnetic disk drive system as set forth in claim 5, wherein said write/read head distance measuring means detects said predetermined positional information in a search window, said write/read head distance measuring means detects said predetermined positional information in a search window before said search, and a window width of said search window is increased with each revolution of said magnetic disk.

7. A magnetic disk drive system as set forth in claim 5, wherein said write/read head distance measuring means detects said predetermined positional information in a search window, and a window width of said search window is a size exceeding the second timing.

8. A magnetic disk drive system as set forth in claim 1, wherein said write/read head distance measuring means measures said write/read head distance at a plurality of track positions on said magnetic disk.

9. A magnetic disk drive system as set forth in claim 8, wherein said write/read head distance measuring means performs processing for interpolating a write/read head distance for a not measured track position based on said plurality of measured write/read head distances differing in track position.

10. A magnetic disk drive system as set forth in claim 9, wherein said interpolation processing is performed by an n-ary polynomial.

11. A magnetic disk drive system as set forth in claim 1, wherein said write/read head distance measuring means measures said write/read head distance at the time of turning on the power of the system.

12. A magnetic disk drive system as set forth in claim 1, wherein, when writing said data, said control means reads a write/read head distance stored in said storage means and determines the write start timing corrected based on said write/read head distance.

13. A magnetic disk drive system as set forth in claim 1, wherein, when positioning said magnetic head unit said measurement track, said write/read head distance measuring means instructs the writing of the measurement information to said write head, then offsets said magnetic head unit in a radial direction of said disk by exactly a predetermined amount of offset from the on-track position, reads said measurement information by said read head while subtracting the predetermined amount of offset from said offset position every revolution of said magnetic disk, and measures the write/read head distance in the radial direction of said magnetic disk based on the amount of offset when able to read said information.

14. A magnetic disk drive system as set forth in claim 13, wherein said write/read head distance measuring means offsets said magnetic head unit to an inner side or outer side by exactly said predetermined amount of offset from the on-track position and measures said write/read head distance from the two sides.

15. A magnetic disk drive system as set forth in claim 13, wherein said write/read head distance measuring means measures said write/read head distance at a plurality of track positions on said magnetic disk.

16. A magnetic disk drive system as set forth in claim 15, wherein said write/read head distance measuring means interpolates a write/read head distance for a not measured track position based on said plurality of measured write/read head distances differing in track position.

17. A magnetic disk drive system as set forth in claim 16, wherein said write/read head distance measuring means produces an n-ary polynomial for the write/read head distance for a track position based on said plurality of measured write/read head distances.

18. A magnetic disk drive system as set forth in claim 17, wherein:
said write/read head distance measuring means stores an order and coefficients in said n-ary polynomial in said storage means, and
when reading by said read head, said control means finds the write/read head distance at the on-track position and adds an amount offset based on said write/read head distance to said track position to perform a read seek operation.

19. A magnetic disk drive system as set forth in claim 13, wherein said write/read head distance measuring means measures the write/read head distance when turning on the power of the system.

20. A magnetic disk drive system as set forth in claim 13, wherein, when writing specific information at a predetermined track position by said write head, said control means reads write/read head distance information corresponding to said predetermined track position from said storage means, produces correction information based on said write/read head distance information, then positions said magnetic head unit on track at said predetermined track position, and writes said specific information by said write head at a position shifted from said predetermined track position by exactly by the amount of said correction information.

21. A magnetic disk drive system as set forth in claim 19, wherein said correction information is found by signed calculation by said write/read head distance and an initial offset stored in said storage means.

22. A magnetic disk drive system as set forth in claim 20, wherein said specific information includes hardware-specific information and is written in a specific sector on said magnetic disk.

23. A magnetic disk drive system as set forth in claim 20, wherein, when reading said specific information by said read head, said control means reads said initial offset value stored in said storage means, then positions said magnetic head unit on said predetermined track, shifts said magnetic head unit by exactly said initial offset value, and reads said specific information from said read head.

* * * * *